US011061466B2

(12) United States Patent
Järvinen et al.

(10) Patent No.: US 11,061,466 B2
(45) Date of Patent: Jul. 13, 2021

(54) APPARATUS AND ASSOCIATED METHODS FOR PRESENTING SENSORY SCENES

(71) Applicant: Nokia Technologies Oy, Espoo (FI)

(72) Inventors: Kari Juhani Järvinen, Tampere (FI); Adriana Vasilache, Tampere (FI); Henri Toukomaa, Tampere (FI); Sujeet Shyamsundar Mate, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/622,442

(22) PCT Filed: Jun. 11, 2018

(86) PCT No.: PCT/FI2018/050430
§ 371 (c)(1),
(2) Date: Dec. 13, 2019

(87) PCT Pub. No.: WO2019/002665
PCT Pub. Date: Jan. 3, 2019

(65) Prior Publication Data
US 2020/0209952 A1 Jul. 2, 2020

(30) Foreign Application Priority Data

Jun. 28, 2017 (EP) .................................. 17178345

(51) Int. Cl.
G06F 3/01 (2006.01)
(52) U.S. Cl.
CPC .............. G06F 3/011 (2013.01); G06F 3/017 (2013.01)

(58) Field of Classification Search
CPC .................................. G06F 3/011; G06F 3/017
See application file for complete search history.

(56) References Cited

U.S. PATENT DOCUMENTS

2014/0368535 A1 12/2014 Salter et al.
2017/0098453 A1* 4/2017 Wright .................... G06F 3/017

FOREIGN PATENT DOCUMENTS

EP 3037915 A1 6/2016
EP 3174005 A1 5/2017

OTHER PUBLICATIONS

Office action received for corresponding European Patent Application No. 17178345.9, dated Mar. 31, 2020, 7 pages.
(Continued)

Primary Examiner — Charles V Hicks
(74) Attorney, Agent, or Firm — Harrington & Smith

(57) ABSTRACT

In respect of virtual-or-augmented reality content comprising data to provide a first sensory scene and a second, different, sensory scene to a user, based on a user-lock-input to lock the first sensory scene; provide for, based on one or both of a user-input to change user orientation in a virtual space and a user-input to change user location in said virtual space, i) presentation of the second sensory scene with a corresponding change in the second sensory scene relative to the user to account for the change in one or both of orientation and location of the user in the virtual space; and ii) presentation of the first, locked, sensory scene with no corresponding change in the first sensory scene relative to the user to account for the change in one or both of orientation and location of the user in the virtual space.

21 Claims, 14 Drawing Sheets

(56) References Cited

OTHER PUBLICATIONS

"Sony's 'Joshua Bell VR Experience' on PSVR is Among the Best VR Video You'll Find on Any Headset", Road Tovr, Retrieved on Dec. 11, 2019, Webpage available at : https://www.roadtovr.com/now-psvr-sonys-joshua-bell-vr-experience-among-best-vr-video-youll-tind-headset/.
Extended European Search Report received for corresponding European Patent Application No. 17178345.9, dated Nov. 2, 2017, 8 pages.
International Search Report and Written Opinion received for corresponding Patent Cooperation Treaty Application No. PCT/FI2018/050430, dated Oct. 2, 2018, 11 pages.

* cited by examiner

APPARATUS AND ASSOCIATED METHODS FOR PRESENTING SENSORY SCENES

RELATED APPLICATION

This application was originally filed as PCT Application No. PCT/FI2018/050430, filed on Jun. 11, 2018, which claims priority from EP Application No. 17178345.9, filed on Jun. 28, 2017.

TECHNICAL FIELD

The present disclosure relates to the field of virtual reality and/or augmented reality and, in particular, to the field of locking the presentation of a subset of sensory scenes relative to user movement in the other sensory scenes, associated methods, computer programs and apparatus.

BACKGROUND

Virtual reality and augmented reality content is becoming more common. While virtual and augmented reality experiences may become more realistic and immersive, the virtual nature of the experience may provide for different ways to experience the content.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  in respect of virtual-or-augmented reality content comprising data to provide a first sensory scene and a second, different, sensory scene to a user, and data to provide a virtual space in which to present said sensory scenes as one of virtual reality and augmented reality, the user having a location and orientation in said virtual space, the sensory scenes comprising content for presentation to a user at least from one of specific directions and specific locations in the virtual space, the sensory scenes selected from:
  a visual scene for presenting visual content,
  an audio scene for presenting audio content,
  a tactile scene for presenting touch stimuli content,
  an olfactory scene for presenting olfactory stimuli content, and,
  a taste scene for presenting taste stimuli content,
  the sensory scenes defined relative to the virtual space such that one or both of a user-input to change user orientation in the virtual space and a user-input to change user location in said virtual space provides for a corresponding change in presentation of the at least first and second sensory scenes relative to the user to account for the orientation and location of the user in the virtual space, and based on a user-lock-input to lock the first sensory scene;
  provide for, based on one or both of the user-input to change user orientation in the virtual space and the user-input to change user location in said virtual space,
  i) presentation of the second sensory scene with a corresponding change in the second sensory scene relative to the user to account for the change in one or both of orientation and location of the user in the virtual space; and
  ii) presentation of the first, locked, sensory scene with no corresponding change in the first sensory scene relative to the user to account for the change in one or both of orientation and location of the user in the virtual space.

In one or more examples, the sensory scenes comprise content for presentation to a user based on the user's location and orientation in the virtual reality space to represent the content or stimuli provided by the sensory scene being arranged in the virtual space around the user. In one or more examples, the user may be free to change only their orientation in the virtual reality space, which may be known as 3 DoF virtual reality. In one or more examples the user may be free to change both their orientation and location in the virtual reality space, which may be known as 6 DoF virtual reality.

In one or more embodiments, the first sensory scene comprises one of the visual scene and the audio scene and the second sensory scene comprises the other of the visual scene and the audio scene.

In one or more examples, the sensory scene defines locations in the virtual space from which the content defined in the sensory scene is to be perceived by the user. Accordingly, in one or more examples, a change in user orientation and/or location in the virtual space provides for a corresponding change in user orientation and/or location relative to the sensory scene and the sensory scene may be presented to the user accordingly. In one or more examples, the sensory scene defines directions relative to the user's position in the virtual space from which the content defined in the sensory scene is to be perceived by the user. Accordingly, in one or more examples, a change in user orientation in the virtual space provides for a corresponding change in orientation of the directions defined by the sensory scene relative to the user. In one or more examples, a change in user location in the virtual space provides for a determination of a corresponding change in the directions defined by the sensory scene relative to the user to account for the change in location.

In one or more examples, one of the first and second sensory scenes comprises the visual scene presented in the virtual space for viewing by the user, the user provided with a view comprising a sub-portion of said visual scene at any one time based on one or more of the orientation and location of the user in the virtual space. In one or more examples, one of the first and second sensory scenes comprises the audio scene, the audio scene presented as spatial audio such that the user perceives the audio of the audio scene to originate from locations or directions specified, in part, by said audio scene and based on one or more of the orientation and location of the user in the virtual space. In one or more examples, one of the first and second sensory scenes comprises the tactile scene, the tactile scene presented such that the user perceives the tactile stimuli of the tactile scene to originate from locations or directions specified, in part, by said tactile scene and based on one or more of the orientation and location of the user in the virtual space. In one or more examples, one of the first and second sensory scenes comprises the olfactory scene, the olfactory scene presented such that the user perceives the olfactory stimuli of the olfactory scene to originate from locations or directions specified, in part, by said olfactory scene and based on one or more of the orientation and location of the user in the virtual space. In one or more examples, one of the first and second sensory scenes comprises the taste scene, the taste scene presented such that the user perceives the taste stimuli of the taste scene to originate from locations or directions specified, in part, by said taste scene and based on one or more of the orientation and location of the user in the virtual space.

In one or more embodiments, based on a user-unlock-input to unlock the first sensory scene, and the apparatus having received user-input to change one or both of the user orientation in the virtual space to a new orientation and the user location in said virtual space to a new location prior to said user-unlock-input;
  provide for presentation of the first sensory scene with a change in one or both of:
  i) the orientation of the first sensory scene relative to the user to correspond to the new orientation and
  ii) the location of the first sensory scene relative to the user to correspond to the new location.

In one or more examples, based on a user-unlock-input to unlock the first sensory scene, and the apparatus having received user-input to change one or both of the user orientation in the virtual space from a first orientation when the user-lock-input was provided to a new orientation and the user location in said virtual space from a first location when said user-lock-input was provided to a new location prior to said user-unlock-input;
  provide for presentation of the second sensory scene with a change in one or both of:
  i) the orientation of the second sensory scene relative to the user to correspond to the first orientation and
  ii) the location of the second sensory scene relative to the user to correspond to the first location.

In one or more embodiments, the user-lock-input comprises one or more of:
  a user gesture specific to the sensory scene to be locked; and
  a user actuation of a user interface specific to the sensory scene to be locked.

In one or more embodiments, the apparatus is provided with the user-lock-input based on performance of a user hand gesture by the user and the user-unlock-input based on ceasing the performance of the user hand gesture by the user.

In one or more embodiments, based on movement of the user's hand during performance of the user hand gesture;
  provide for presentation of the locked first sensory scene with a change in one or both of the orientation and location of the first sensory scene relative to the user corresponding to said movement of the user's hand.

In one or more examples, the user-lock-input for locking the visual scene comprises a user hand gesture to a position adjacent the user's eyes. In one or more examples, the user-lock-input for locking the audio scene comprises a user hand gesture to a position adjacent the user's ears.

In one or more embodiments, the apparatus is configured to provide an indication to the user to identify when the first sensory scene is locked.

In one or more examples, the indication comprises one or more of a visual indication, audio indication and indication using the sense associated with the first sensory scene.

In one or more embodiments, based on the first sensory scene being locked, provide for, based on one or both of:
  a second user-input, different to the user-input to change user orientation in the virtual space and
  a third user-input, different to the user-input to change user location in said virtual space,
  presentation of the locked first sensory scene with a change in one or both of the orientation and location of the first sensory scene relative to the user corresponding to said second user-input and said third user input.

In one or more embodiments, the apparatus is caused to provide for presentation of a graphical indicator showing one or both of the relative orientations and relative positions of the first sensory scene and the second sensory scene at least at some time after receipt of the user-lock-input. In one or embodiments, the presentation of the graphical indicator may be provided at any one or more of (i) directly after receipt of the user-lock-input; (ii) after a predetermined period of time has elapsed after the user-lock-input; (iii) after the user has subsequently provided user-input to change orientation/location in the virtual space; and/or (iv) before providing a user-unlock-input.

In one or more examples, the graphical indicator comprises a compass having marked thereon at least the orientation of the locked first sensory scene relative to the user and the orientation of the second sensory scene relative to the user.

In one or more embodiments, the apparatus is caused to provide for display of a first view of the visual scene in the virtual space and a second view of the visual scene in the virtual space in a split screen arrangement, the first view showing the view of the user having a current location and orientation in the virtual space and the second view showing the view of the user having a location and orientation in the virtual space corresponding to the time of receipt of the user-lock-input.

In one or more embodiments, the first sensory scene comprises a visual scene presented in the virtual space for viewing by the user, the user provided with a view comprising a sub-portion of said visual scene at any one time; and
  wherein the user-lock-input includes a definition of sub-region of the view of the visual scene; and
  wherein the apparatus is caused provide for, based on one or both of a user-input to change user orientation in the virtual space and a user-input to change user location in said virtual space,
  i) presentation of the second sensory scene with a corresponding change in one or both of the orientation and location of the second sensory scene relative to the user;
  ii) presentation of the first sensory scene with a corresponding change in one or both of the orientation and location of the first sensory scene relative to the user;
  iii) presentation of the first sensory scene within the defined sub-region with no change in the orientation and location of the visual content of the first sensory scene relative to the user.

Thus, in one or more examples, the user may provide for locking of only a region of the sensory scene while in other examples the apparatus provides for locking of the whole sensory scene such that it is presented independent of user-input to change user orientation and/or user location in the virtual reality space.

In one or more embodiments, the first sensory scene comprises a visual scene presented in the virtual reality space for viewing by the user, the user provided with a view comprising a sub-portion of said visual scene at any one time; and based on a user-lock-input to lock the first sensory scene with the user having one or both of a first orientation and a first location in the virtual space;

provide for, in the absence of user-input to change user orientation in the virtual space and a user-input to change user location in said virtual space, i) presentation of the first sensory scene based one or both of the first orientation and the first location relative to the user; and provide for, on receipt of one or both of a user-input to change user orientation in the virtual space and a user-input to change user location in said virtual space, i) presentation of the second sensory scene with a corresponding change in one or both of the orientation and location of the second sensory scene relative to the user; and ii) presentation of the first sensory scene with a corresponding change in one or both of the orientation and location of the second sensory scene relative to the user until said user-input is no longer provided.

In one or more embodiments, the user-input to change user orientation in the virtual space is based on real-world head orientation of the user and a user-input to change user location in said virtual space is based on real-world translational movement of the user.

In a further aspect there is provided a method, the method comprising:

in respect of virtual-or-augmented reality content comprising data to provide a first sensory scene and a second, different, sensory scene to a user, and data to provide a virtual space in which to present said sensory scenes as one of virtual reality and augmented reality, the user having a location and orientation in said virtual space, the sensory scenes comprising content for presentation to a user at least from one of specific directions and specific locations in the virtual space, the sensory scenes selected from:

a visual scene for presenting visual content,
an audio scene for presenting audio content,
a tactile scene for presenting touch stimuli content,
an olfactory scene for presenting olfactory stimuli content, and,
a taste scene for presenting taste stimuli content, the sensory scenes defined relative to the virtual space such that one or both of a user-input to change user orientation in the virtual space and a user-input to change user location in said virtual space provides for a corresponding change in presentation of the at least first and second sensory scenes relative to the user to account for the orientation and location of the user in the virtual space, and based on a user-lock-input to lock the first sensory scene;
providing for, based on one or both of the user-input to change user orientation in the virtual space and the user-input to change user location in said virtual space, i) presentation of the second sensory scene with a corresponding change in the second sensory scene relative to the user to account for the change in one or both of orientation and location of the user in the virtual space; and ii) presentation of the first, locked, sensory scene with no corresponding change in the first sensory scene relative to the user to account for the change in one or both of orientation and location of the user in the virtual space.

In a further aspect there is provided a computer readable medium comprising computer program code stored thereon, the computer readable medium and computer program code being configured to, when run on at least one processor, perform the method of in respect of virtual-or-augmented reality content comprising data to provide a first sensory scene and a second, different, sensory scene to a user, and data to provide a virtual space in which to present said sensory scenes as one of virtual reality and augmented reality, the user having a location and orientation in said virtual space, the sensory scenes comprising content for presentation to a user at least from one of specific directions and specific locations in the virtual space, the sensory scenes selected from:

a visual scene for presenting visual content,
an audio scene for presenting audio content,
a tactile scene for presenting touch stimuli content,
an olfactory scene for presenting olfactory stimuli content, and,
a taste scene for presenting taste stimuli content, the sensory scenes defined relative to the virtual space such that one or both of a user-input to change user orientation in the virtual space and a user-input to change user location in said virtual space provides for a corresponding change in presentation of the at least first and second sensory scenes relative to the user to account for the orientation and location of the user in the virtual space, and based on a user-lock-input to lock the first sensory scene;
providing for, based on one or both of the user-input to change user orientation in the virtual space and the user-input to change user location in said virtual space, i) presentation of the second sensory scene with a corresponding change in the second sensory scene relative to the user to account for the change in one or both of orientation and location of the user in the virtual space; and ii) presentation of the first, locked, sensory scene with no corresponding change in the first sensory scene relative to the user to account for the change in one or both of orientation and location of the user in the virtual space.

In a further aspect there is provided an apparatus, the apparatus comprising means configured to;

in respect of virtual-or-augmented reality content comprising data to provide a first sensory scene and a second, different, sensory scene to a user, and data to provide a virtual space in which to present said sensory scenes as one of virtual reality and augmented reality, the user having a location and orientation in said virtual space, the sensory scenes comprising content for presentation to a user at least from one of specific directions and specific locations in the virtual space, the sensory scenes selected from:

a visual scene for presenting visual content,
an audio scene for presenting audio content,
a tactile scene for presenting touch stimuli content,
an olfactory scene for presenting olfactory stimuli content, and,
a taste scene for presenting taste stimuli content, the sensory scenes defined relative to the virtual space such that one or both of a user-input to change user orientation in the virtual space and a user-input to change user location in said virtual space provides for a corresponding change in presentation of the at least first and second sensory scenes relative to the user to account for the orientation and location of the user in the virtual space, and based on a user-lock-input to lock the first sensory scene;
provide for, based on one or both of the user-input to change user orientation in the virtual space and the user-input to change user location in said virtual space,
i) presentation of the second sensory scene with a corresponding change in the second sensory scene relative to the user to account for the change in one or both of orientation and location of the user in the virtual space; and
ii) presentation of the first, locked, sensory scene with no corresponding change in the first sensory scene relative to the user to account for the change in one or both of orientation and location of the user in the virtual space.

The present disclosure includes one or more corresponding aspects, examples or features in isolation or in various combinations whether or not specifically stated (including claimed) in that combination or in isolation. Corresponding means and corresponding functional units (e.g., function enabler, spatial audio presenter, spatial audio modifier, movement tracker, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
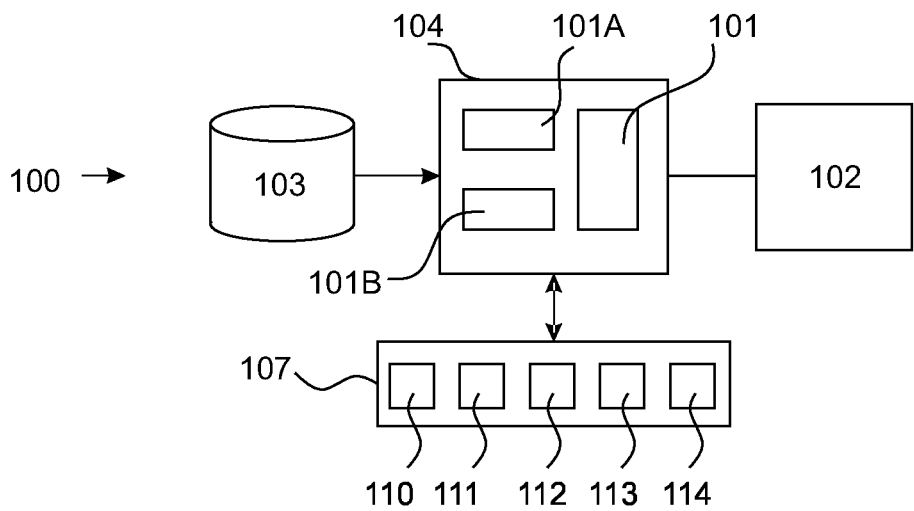
FIG. 1 illustrates an example apparatus for providing for locking of a first sensory scene and a virtual reality apparatus.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones configured to capture the surrounding visual and aural scene from a capture point of view. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present.

The virtual reality content may comprise, and a VR apparatus presenting said VR content may provide, pre-defined-viewing-location VR or free-viewing-location VR. In predefined-viewing-location VR, the location of the user in the virtual reality space may be fixed or follow a pre-defined path. Accordingly, a user may be free to change their viewing direction with respect to the virtual reality imagery provided for display around them in the virtual reality space, but they may not be free to arbitrarily change their viewing location in the VR space to explore the VR space. Thus, the user may experience such VR content from a fixed point of view or viewing location. In some examples of predefined-viewing-location VR the imagery may be considered to move past them. In predefined-viewing-location VR content captured of the real world, the user may be provided with the point of view of the VR content capture device.

Predefined-viewing-location VR content may provide the user with three degrees of freedom in the VR space comprising rotation of the viewing direction around any one of x, y and z axes. Accordingly, this type of VR may be termed three degrees of freedom (3 DoF) VR.

In free-viewing-location VR, the VR content and VR apparatus presenting said VR content may enable a user to be free to explore the virtual reality space. Thus, the user may be provided with a free point of view or viewing location in the virtual reality space. Free-viewing-location VR is also known as six degrees of freedom (6 DoF) VR or volumetric VR to those skilled in the art. Thus, in 6 DoF VR, the user may be free to look in different directions around the VR space by modification of their viewing direction and also free to change their viewing location (their virtual location) in the VR space by translation along any one of x, y and z axes.

One or more examples described herein relates to 6 DoF virtual reality content in which the user is at least substantially free to move in the virtual space either by user-input through physically moving or, for example, via a dedicated user interface (UI). The movement available in a 6 DoF virtual reality space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the VR space from a different virtual location, i.e., move along the x, y, and z axes according to their wishes. The translational movements may be referred to as surge (x), sway (y), and heave (z).

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world.

In addition to the audio received from the microphone(s) of the VR/AR content capture device further microphones each associated with a distinct audio source may be provided. In one or more examples, the VR content capture device may not have microphones and the aural scene may be captured by microphones remote from the VR content capture device. Thus, microphones may be provided at one or more locations within the real world scene captured by the VR content capture device, each configured to capture audio from a distinct audio source. For example, using the musical performance example, a musical performer or a presenter may have a personal microphone. Knowledge of the location of each distinct audio source may be obtained by using transmitters/receivers or identification tags to track the position of the audio sources, such as relative to the VR content capture device, in the scene captured by the VR content capture device. Thus, the VR content may comprise the visual imagery captured by one or more VR content capture devices and the audio captured by the one or more VR content capture devices and, optionally/alternatively, one or more further microphones. The location of the further microphones may be provided for providing spatial audio.

Spatial audio comprises audio presented in such a way to a user that it is perceived to originate from a particular location, as if the source of the audio was located at that particular location. Thus, virtual reality content may be provided with spatial audio having directional properties, such that the audio is perceived to originate from a point in the VR space, which may be linked to the imagery of the VR content. Augmented reality may be provided with spatial audio, such that the spatial audio is perceived as originating from real world objects visible to the user and/or from augmented reality graphics overlaid over the user's view.

The spatial positioning of the spatial audio may be provided by the degree to which audio is presented to each channel of a multichannel audio arrangement, as well as by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude panning (VBAP) techniques to position the perceived aural origin of the audio content.

The capture of spatial audio may be provided by a spatial audio capture microphone array that may be free to rotate during capture of the audio, such as an array mounted to a headset or the like of a "capture user". In other examples, the spatial audio capture microphone array may be attached to a boom or robot that may cause rotation of the array during capture of the spatial audio. It will be appreciated that with a rotatable spatial audio capture microphone array the direction to the audio sources in the scene relative to the array will change with rotation of the array. This may result in generation of confusing spatial audio with what may be perceived as random variations (caused by rotation of the array during capture) in the direction from which the audio sources are heard when said spatial audio is presented to a recipient user. Accordingly, the presentation of spatial audio when it is captured from rotatable spatial audio capture microphone arrays, such as head mounted arrays, may be challenging.

Virtual reality or augmented reality content and associated user presentation apparatus (e.g. VR apparatus or AR apparatus), may provide for presentation of other stimuli to a user in addition to the visual imagery and spatial audio described above.

In one or more examples, the user may be presented with olfactory stimuli to present a virtual olfactory scene around the user. Thus, the olfactory stimuli or "smells" may be presented in such a way to a user that the or each smell is perceived to originate from a particular location or region, as if the odour source was located at that particular location. Thus, an olfactory interface may be provided with the VR or AR headset or may be separate thereto. The olfactory interface may be configured to deliver smells, such as in gaseous form, based on the user's orientation and/or position in a virtual space. Accordingly, in one or more examples, user head orientation and, optionally, translational movement of the user in the real-world may provide for corresponding orientation changes and movement in a virtual space and the olfactory interface may provide the olfactory stimuli or smells corresponding to the user's position/orientation. As an example, virtual reality content may show a garden which may be explored. The garden may include virtual aromatic herbs in a particular part of the garden and when the user turns towards said herbs or is within a predetermined distance of said herbs, the olfactory interface may be controlled to provide the smell of the herbs to the user. When the user moves away from or turns away from the virtual herbs, the olfactory interface may be controlled to stop providing the smell of the herbs to the user. A plurality of nozzles placed around the user may be used to present the olfactory scene. In other examples, the nozzle(s) may be placed adjacent the user's nose and the smells delivered by the nozzles may be based on the user's virtual orientation/position in the virtual space.

In one or more examples, the user may be presented with tactile stimuli as part of a virtual and or augmented reality experience. The tactile stimuli may be in such a way to a user that the or each tactile stimuli is perceived to originate from a particular location, as if the source of the tactile stimuli was located at that particular location. For example, the tactile stimuli may represent a sea breeze. Accordingly, when the user looks towards the sea in a virtual reality experience, a tactile interface may provide a stream of air towards the user's face. As the user looks away from the sea, the stream of air simulating the sea breeze may be applied to the side of their face or body or whatever part of their body faces the virtual sea. In another example, a virtual person may be presented as part of a virtual reality experience and that virtual person may appear to place their hand on the user. The tactile interface may be configured to apply pressure to the user's body at a position that corresponds to the user's orientation and position relative to the hand of the virtual person.

In one or more examples, the user may be presented with gustatory or taste stimuli to present a virtual taste scene around the user. Thus, the taste stimuli may be presented in such a way to a user that the or each taste is perceived to originate from a particular location or region, as if the source of the taste was located at that particular location. Thus, a taste interface may be provided with the VR or AR headset or may be separate thereto. The taste interface may be configured to deliver tastes, such as in liquid or vapour form, based on the user's orientation and/or position in a virtual space. Accordingly, in one or more examples, user head orientation and, optionally, translational movement of the user in the real-world will provide for corresponding orientation changes and movement in a virtual space and the taste interface may provide the taste stimuli corresponding to the user's position/orientation. As an example, virtual reality content may show a scene of gin factory, which may be explored in virtual reality to create a user-defined bottle of gin. The factory may include a variety of botanicals to select for creating the bespoke bottle of gin and when the user turns towards a particular botanical for infusion in the gin or is within a predetermined distance thereof, the taste interface may be controlled to provide the taste of the botanical to the user. When the user moves away from or turns away from the botanical, the taste interface may be controlled to stop providing the taste of the botanical to the user.

Thus, to summarise, the virtual reality and/or augmented reality content may include data to provide for generation of a virtual space and for stimulation of the user in terms of one, two, three, four or more sensory modalities in accordance with one or more of the viewing direction and position of the user in said virtual space. Thus, the virtual reality or augmented reality content may comprise data to provide for generation of a virtual space in which one or more of the following is presented to the user:

visual imagery presented in accordance with one or more of a user orientation in the virtual space and a user location in said virtual space;

spatial audio presented in accordance with one or more of a user orientation in the virtual space and a user location in said virtual space;

olfactory stimuli presented in accordance with one or more of a user orientation in the virtual space and a user location in said virtual space;

tactile stimuli presented in accordance with one or more of a user orientation in the virtual space and a user location in said virtual space; and gustatory stimuli presented in accordance with one or more of a user orientation in the virtual space and a user location in said virtual space;

Accordingly, changes in one or both of:

i) the user orientation in the virtual space; and ii) the user location in said virtual space;

may provide for a corresponding change in one or more of the direction of presentation and intensity of presentation of one or more of visual imagery; spatial audio; olfactory stimuli; tactile stimuli; and gustatory stimuli.

One or more examples described herein relate to virtual reality or both augmented and virtual reality, so called mixed reality.

With reference to the example of FIG. 1, we disclose a system 100 that includes an apparatus 101 and a virtual reality apparatus 104 for presentation of virtual reality content to a user. In other examples, the apparatus 101 may be associated with an augmented reality apparatus for presentation of augmented reality content to a user. Thus, in general terms, the apparatus 101 and apparatus 104 may provide for presentation of virtual-or-augmented reality content.

The virtual-or-augmented reality content may comprise data to provide a plurality of sensory scenes to create a virtual or augmented experience for the user. The sensory scenes may include a first sensory scene and a second, different, sensory scene and, optionally, third, fourth or more sensory scenes. The virtual-or-augmented reality content may provide data to generate a virtual space the user can explore in one of virtual reality and augmented reality. The user may be provided with a position and/or orientation in said virtual space and may be presented with the content of the sensory scenes based on said position and/or orientation. The sensory scenes may comprise content for presentation to a user at least from directions that partially surround or surround the user in the virtual space. As mentioned above, different sensory stimuli may be presented as part of a virtual or augmented reality experience and thus the sensory scenes may be selected from a visual scene for presenting visual content, an audio scene for presenting audio content, a tactile scene for presenting touch stimuli content, an olfactory scene for presenting olfactory stimuli content, and, a taste scene for presenting taste stimuli content.

The sensory scenes may be defined relative to the virtual space such that one or both of a user-input to change user orientation in the virtual space and a user-input to change in user location in said virtual space provides for a corresponding change in presentation of the at least first and second sensory scenes to the user to account for the orientation and position of the user in the virtual space. Thus, for 3 DoF VR/AR, the sensory scene may define directions from which the corresponding stimuli are to be presented to the user and the orientation of the user's head while consuming the content may affect the direction from which it is presented. Thus, a user turning 90 degrees to the left in the virtual space may be presented with the visual imagery of a visual scene that would be seen 90 degrees to the left. The audio scene may be presented with a 90 degree change such that audio heard in front of the user is now heard 90 degrees to the right i.e. in the user's right ear, as if the audio source has remained stationary. The olfactory scene may be presented such that smells defined in the scene are presented to a user only when the user turns their head towards them or with greater intensity when the user looks towards them. The taste scene may be presented such that tastes defined in the scene are presented to a user only when the user turns their head towards them or with greater intensity when the user looks towards them. The tactile scene may be presented such that the touch stimuli defined in the scene are presented to a user to account for the user's change in orientation such that a tap on the user's right shoulder would, after the 90 degree turn, be felt on the user's back.

For 6 DoF VR/AR, the sensory scene may define locations in the virtual space from which the "source" of the stimuli are to be presented to the user. Thus, as the user moves around and changes their orientation in the virtual space the direction from and the intensity with which the sensory stimuli are presented may be modified accordingly. Thus, an audio scene may define the location of virtual sources of audio and the spatial audio may be presented to the user based on their location relative to the one or more virtual source of audio in the virtual space. The visual, olfactory, taste and tactile scenes may, in one or more examples, be defined similarly with virtual sources of visual imagery, smell, taste and touch stimuli defined in the virtual space. Nevertheless, it will be appreciated that sensory scenes may be defined in many different ways using virtual locations that define the "source" of the stimuli or may use other techniques without such "sources". However, whichever way the sensory scenes are defined, the user's location and/or orientation in the virtual space may influence how the sensory scene is presented to the user.

In one or more examples the sensory scenes define a three dimensional environment in which the content of the sensory scene can be experienced. In one or more examples the three dimensional environment may be defined relative to the three-dimensional virtual space such that the sensory scenes are experienceable, and may therefore each be presented to the user, from a presentation location in the virtual space comprising a point of view location in the virtual space from which the sensory scene is appreciated and with a presentation orientation in the virtual space comprising the direction of view with which the sensory scene is appreciated. Thus, each sensory scene may be presented to a user with an associated presentation orientation and/or from a presentation location to present the sensory scene as if the user were located at the presentation location and/or has the presentation orientation in the sensory scene.

While providing for exploring 3 DoF or 6 DoF virtual-or-augmented-reality content, such as by apparatus 104, the apparatus 101 may be configured to respond to a user-lock-input. The user-lock input may indicate that the user is desirous of locking at least one of the sensory scenes to at least temporarily prevent further changes to user location or user orientation in the virtual space from affecting how the locked sensory scene is presented to them. The non-locked sensory scenes can continue to be explored based on user input to cause changes to user location or user orientation in the virtual space.

With reference to the example of FIG. 1, the apparatus 101, based on a user-lock-input is configured to provide for locking of at least a first of the first and second sensory scene such that user input to change location and/or change orientation in the virtual space does not influence the presentation location and presentation orientation of the first sensory scene but may continue to influence the presentation location and presentation orientation of the second sensory scene. Thus, it may therefore appear to the user that their appreciation of the first sensory scene is from an at least temporarily fixed location in a virtual space and/or an at least temporarily fixed orientation in the virtual space, while they may continue to change their orientation and/or location in the virtual space to appreciate the second sensory scene from different presentation locations and/or with different presentation orientations. Accordingly, different sensory scenes may be locked while others are left unlocked in terms of modification of the presentation location and/or presentation orientation of a particular sensory scene, accordingly to a user's preference, during continued changes in orientation and/or location in the virtual space.

Thus, to explain further, the first sensory scene may comprise spatial audio scene and the second sensory scene may comprise the visual scene. The user may be presented with a view of only a portion of the visual scene at any one time. In one or more examples, user input, such as in the form of head movements, may allow for the user to look around the visual scene. It will be appreciated that the spatial audio that forms the audio scene may have information representing the directions towards/locations of the audio sources in the audio scene, which can be presented to a recipient user using spatial audio presentation techniques (e.g. HRTF, VBA) to provide the audio scene that corresponds to the visual scene. Thus, the audio generated by an object in the audio scene may be aligned with a visual representation of the same object in the visual scene. The same principle may be applied when the first sensory scene comprises one of a tactile scene for presenting touch stimuli content, an olfactory scene for presenting olfactory stimuli content, and a taste scene for presenting taste stimuli content. Further, in other examples, the second sensory scene may comprise a sensory scene other than the visual scene. In one or more examples, the first and second sensory scenes may comprise any two of a visual scene for presenting visual content, an audio scene for presenting audio content, a tactile scene for presenting touch stimuli content, an olfactory scene for presenting olfactory stimuli content, and, a taste scene for presenting taste stimuli content. It will be appreciated that, in one or more examples, three or more of said sensory scenes may be presented as part of the experience provided to the user and the user-lock-input may provide for locking of one or more of said sensory scenes.

The apparatus 101 may comprise or be connected to a processor 101A and a memory 101B configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor 101A may be a general purpose processor dedicated to executing/processing information received from other components, such as from a content store 103 and a user input device 102, which may comprise a user movement and or head orientation tracker, in accordance with instructions stored in the form of computer program code in the memory. The output signalling generated by such operations of the processor is provided onwards to further components, such as to VR headset 107 for presentation of the sensory scenes to the user.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of a virtual reality apparatus 104 for presenting a virtual space, the sensory scenes presented to the user in accordance with one or more or the user orientation (e.g. the user's viewing direction in the virtual space) and the user location in the virtual space.

In one or more examples, the apparatus 101 may be independent of an AR or VR apparatus and may be in communication with the AR or VR apparatus for acting on user provision of a user-lock input. In this example, the processor 101A and memory 101B is shared by the VR apparatus 104 and the apparatus 101, but in other examples, they may have their own processors and/or memory. The virtual reality apparatus 104 may present two or more of the sensory scenes to the user via the VR headset 107. The VR headset 107 may include one or more displays 110 to display the visual imagery content of the visual scene. The VR headset 107 may include two or more speakers 111 to present the spatial audio content of the audio scene. The VR headset 107 may include one or more smell delivery devices 112 to present the olfactory stimuli of the olfactory scene. The VR headset 107 may include one or more taste delivery devices 113 to present the taste stimuli of the taste scene. The VR headset 107 or a body suit in other examples may include one or more touch stimuli delivery devices 114 to present the touch or "haptic" stimuli of the tactile scene.

The apparatus 101 and/or VR apparatus 104 may receive input representative of user movement and/or head orientation from the user input device 102. The device 102 may be configured to determine the orientation of the user's head or the user's position in a room or space or changes therein. The input may be used, by the apparatus 101 and/or VR apparatus 104, to modify the presentation of the sensory scenes. Thus, for the spatial audio scene the apparatus 101, 104 may be configured to apply a modification to the HRTF or VBA to take account of head movements of the user to modify the presentation orientation of the audio scene.

In the examples that follow the first and second sensory scenes are typically a visual scene and an audio scene. However, it will be appreciated that the principles exemplified by the examples can be applied to any other combination of sensory scenes.

Figure 2:
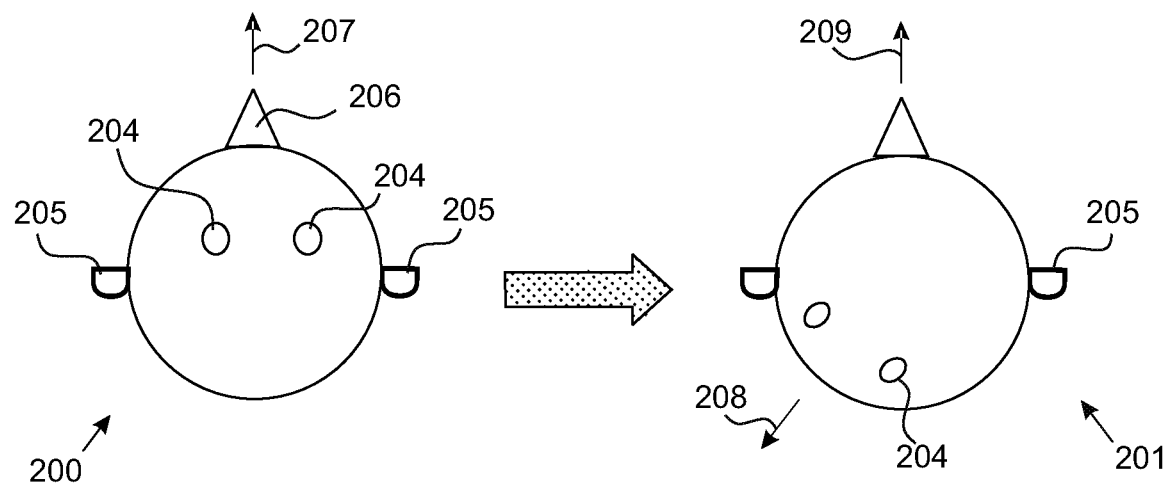
FIG. 2 shows a first example of the effect of locking the audio scene and then changing orientation of the user relative to the visual scene.

The example of FIG. 2 shows an illustration of the orientation of the sensory scenes before 200 and after 201 a user-lock-input to lock the first sensory scene. The example of FIG. 2 may be applied to 3 DoF or 6 DoF content. The user-lock-input is indicative of a desire of the user to maintain a particular presentation orientation or presentation location for one of the sensory scenes, in this example named the first sensory scene. FIG. 2 shows a plan view of a head 203 having eyes 204 to show where in the virtual space the user is currently looking, i.e. the user's viewing direction. The head also has ears 205 to show where the hearing of a user is focused on. In particular, while the user may hear sounds from all around them, the orientation of the ears 205 shows the direction from which the user would perceive a sound to be straight ahead of them, i.e. the audiological straight ahead direction. The illustration also shows a nose 206 so that the orientation of the user's head in the virtual reality space can be appreciated or orientation of an olfactory scene relative to the other scenes.

In the example of FIG. 2, the first sensory scene is the audio scene and the second sensory scene is the visual scene. Thus, the "before" situation 200 shows the user having a viewing direction 207 in the virtual space and also the audiological straight ahead direction is direction 207. Thus, the presentation orientation of the visual scene may be direction 207 and the presentation orientation of the audio scene may be direction 207. User-input to change user orientation in the virtual space in the before situation 200 would cause the apparatus 101 and/or 104 to present the visual and audio scene with a corresponding, common, change in presentation orientation such that both the viewing direction and the audiological straight ahead direction are aligned.

In this example, based on the user-lock-input to lock the first, audio sensory scene, the apparatus 101 is configured to provide for, based on subsequent user-input to change user orientation in the virtual space:

i) presentation of the second, visual sensory scene with a corresponding change in the presentation of the second sensory scene relative to the user, which in this example comprises a change in the presentation orientation of the visual scene; and
ii) presentation of the first, audio sensory scene with no change in the orientation and location of the first sensory scene relative to the user such that the orientation of the user in relative to the audio scene is locked, which in this example comprises no change in the presentation orientation or presentation location of the audio scene.

The after situation 201 shows the user have provided the user-lock-input and then having provided user input to rotate their viewing direction 120 degrees to the left. Accordingly, the viewing direction 208 and the position of the eyes 204 on the head indicate that the user is now looking in a different direction in the virtual space and would therefore be presented with visual imagery content of the visual scene corresponding to that viewing direction 208 or presentation orientation. The first, audio sensory scene, however, is presented with no change in presentation orientation. Thus, the first, audio sensory scene may continue to be presented as if the user input to rotate their viewing direction had not been provided or as if it was ignored. The audiological straight ahead direction is direction 209, which is the same direction as direction 207 in the before view 200. There is no change in position of the ears 205 indicating no change in the presentation orientation of the audio scene.

Thus, in terms of what the user is presented with after providing the user-lock-input, the visual scene is changed based on user input to change the orientation in the virtual space, but the spatial audio presented to the user is maintained with the same orientation as at the time of the user-lock-input. Thus, the user has selected to continue to hear the audio scene with a temporarily fixed audiological straight ahead direction while looking at different parts of the visual scene.

Figure 3:
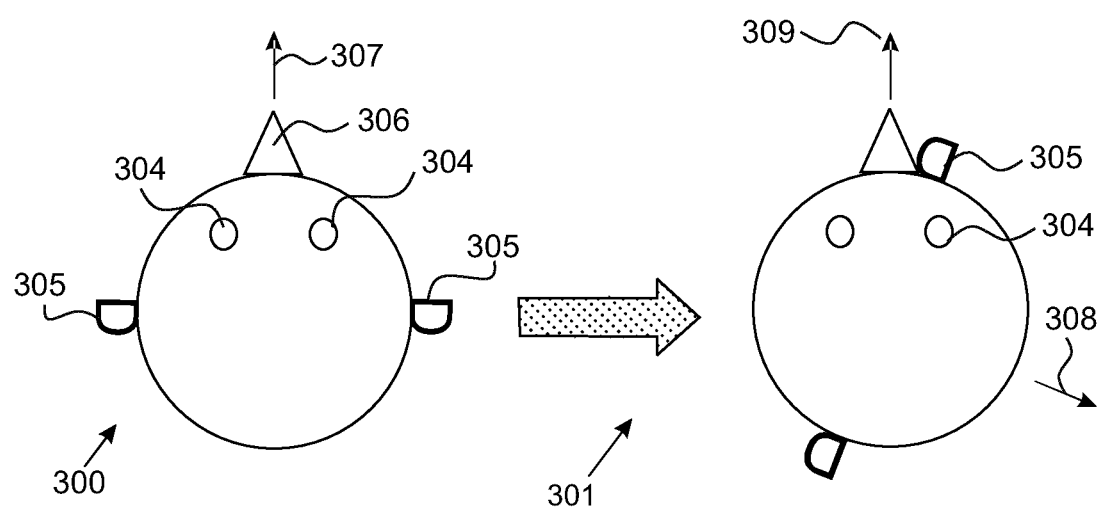
FIG. 3 shows a second example of the effect of locking the visual scene and then changing orientation of the user relative to the audio scene.

FIG. 3 shows a similar example to FIG. 2. The example of FIG. 3 shows the illustration of the orientation of the sensory scenes before 300 and after 301 a user-lock-input to lock the first sensory scene. The example of FIG. 3 may be applied to 3 DoF or 6 DoF content. The user-lock-input is indicative of a desire of the user to maintain a particular orientation or location to one of the sensory scenes, in this example named the first sensory scene. FIG. 3 shows the same plan view and the same numerals have been used but are numbered from "300" rather than "200".

In the example of FIG. 3, the first sensory scene is the visual scene and the second sensory scene is the audio scene, the opposite to FIG. 2. The "before" situation 300 shows the user having a viewing direction 307 in the virtual space and also the audiological straight ahead direction is direction 307. Thus, in this example, the presentation orientation of the visual scene is direction 307 and the presentation orientation of the audio scene is direction 307. User-input to change user orientation in the virtual space in the before situation 300 would cause the apparatus 101 and/or 104 to present the visual and audio scene with a corresponding, common, change in presentation orientation such that both the viewing direction and the audiological straight ahead direction are aligned.

In this example, based on the user-lock-input to lock the first, visual sensory scene, the apparatus 101 is configured to provide for, based on subsequent user-input to change user orientation in the virtual space:

i) presentation of the second, audio sensory scene with a corresponding change in the presentation of the second sensory scene relative to the user, which in this example comprises a change in the presentation orientation of the audio scene; and
ii) presentation of the first, visual sensory scene with no change in the orientation of the first sensory scene relative to the user such that the orientation of the user in relative to the visual scene is locked, which in this example comprises no change in the presentation orientation or presentation location of the audio scene.

Thus, the after situation 301 shows the user have provided the user-lock-input and then having provided user input to rotate their direction in the virtual space 100 degrees to the right, perhaps by a head orientation input, as if to look at a different part of the visual imagery of the visual scene. However, the visual scene is locked. Accordingly, the position of the ears 305 on the head indicate that the user input has provided for a change in the audiological straight ahead direction to direction 308 for presentation of the audio scene but no change in the viewing direction 309 of the visual scene is provided. Thus, in this example, the user would be presented with visual imagery content of the visual scene with a presentation orientation corresponding to the viewing direction 309 like in the before situation 300.

Thus, in terms of what the user is presented with after providing the user-lock-input, the visual scene is unchanged based on user input to change orientation and maintained with the same orientation as at the time of the user-lock-input. The spatial audio presented to the user is changed based on user input to change the orientation, which may comprise a change in presentation orientation of the audio scene. The spatial audio is presented such that the audiological straight ahead direction is aligned with direction 308.

Assuming that user-input to change the orientation is provided by head movements of the user, the head movements after provision of the user-lock-input provide for changing of the audiological straight ahead direction so that the user can focus on a different spatial section of the audio scene but the apparatus maintains the same view of the visual scene.

Figure 4:
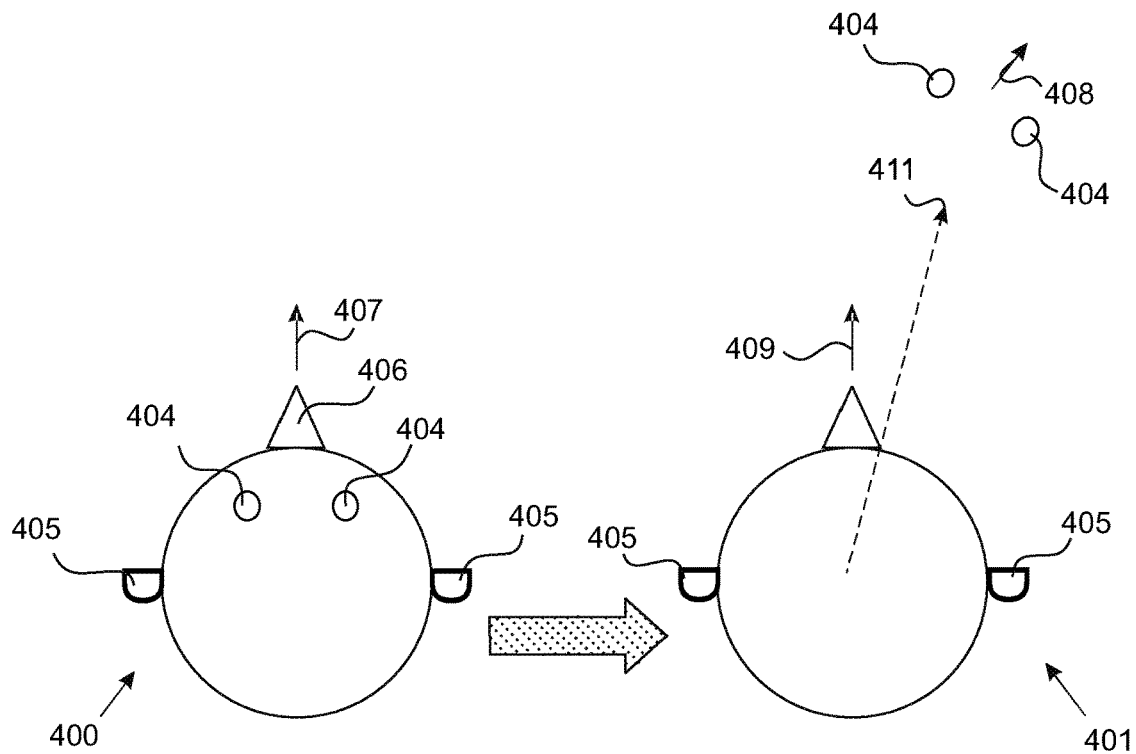
FIG. 4 shows a first example of the effect of locking the audio scene and then changing orientation and location of the user relative to the visual scene.
Figure 5:
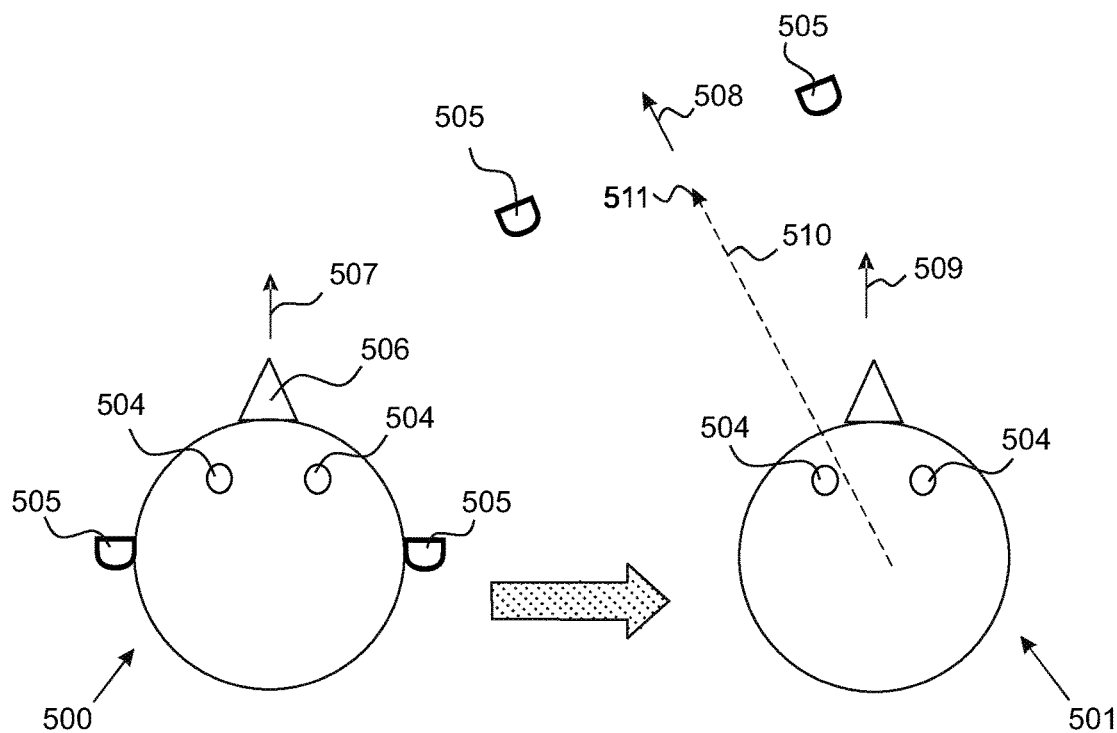
FIG. 5 shows a second example of the effect of locking the visual scene and then changing orientation and location of the user relative to the audio scene.

FIGS. 4 and 5 shows a similar example to those of FIGS. 2 and 3. The examples of FIGS. 4 and 5 may be applied to 6 DoF content, as 6 DoF content allows for user translational movement in the virtual space and therefore the user may hear and see the audio and visual scene not just from different orientations but also from different locations.

FIG. 4 shows a before situation 400 and an after situation 401. In this example the first sensory scene is the audio scene and the second sensory scene is the visual scene. The example of FIG. 4 shows the effect of providing the user-lock-input and changing user orientation and user location in the virtual space.

The before situation 400 shows the eyes 404 illustrating the user is looking in direction 407 and the ears 405 illustrating the audiological straight ahead direction is also direction 407.

The after situation 401 shows the user having provided user input to change their orientation approximately 30 degrees to the right and also translated the distance marked by arrow 411.

Accordingly, the first, visual scene is presented to the user with a corresponding change in orientation and location, i.e. from the point of view and orientation of the eyes 404 in the after situation 401. The visual scene is therefore presented from the new viewing location marked by the point of arrow 411 and viewing direction 408. The second, audio scene is locked by way of the user-lock-input and thus the presentation of audio scene is maintained with the location and orientation as shown in the before situation 400 with orientation 409.

FIG. 5 shows a before situation 500 and an after situation 501. In this example the first sensory scene is the visual scene and the second sensory scene is the audio scene. The example of FIG. 5 shows the effect of providing the user-lock-input and changing user orientation and user location in the virtual space.

The before situation 500 shows the eyes 504 illustrating the user is looking in direction 507 and the ears 505 illustrating the audiological straight ahead direction is also direction 507.

The after situation 501 shows the user having provided user input to change their orientation approximately 40 degrees to the left and also translated the distance marked by arrow 510.

Accordingly, the first, audio scene is presented to the user with a corresponding change in orientation and location, i.e. from the point of view and orientation of the ears 505 in the after situation 501. The user is therefore presented with the audio scene as if the user were at the new viewing location 511 and having orientation 508. The second, visual scene is locked by way of the user-lock-input and thus the presentation of visual scene is maintained with the location and orientation as shown in the before situation 500 with orientation 509. Thus, the eyes 504 have not moved.

The apparatus 101 may also be configured to provide for unlocking of one or more sensory scene based on a user-unlock-input. However, the user-input to change position/orientation may have moved the user's position/orientation in the virtual space to a new, second position and/or orientation while the first sensory scene was locked. Accordingly, the first sensory scene may be presented to the user as if the user were positioned at a first point of view location and/or having a first orientation in the virtual space. The first point of view location/orientation may comprise the point of view location and orientation at the time the user-lock-input was provided. Further, the second sensory scene may be presented to the user as if the user were positioned at a second point of view location and/or having a second orientation, different to the first location and/or orientation. On unlocking, the apparatus 101 may be configured to realign the sensory scenes such that the content of the sensory scenes are presented to the user in accordance with the second location/orientation of the user or the first location/orientation in the virtual space.

In one or more examples, based on a user-unlock-input to unlock the locked, first sensory scene, and the apparatus having received user-input to change one or both of the user orientation in the virtual space to the new, second orientation and the user location in said virtual space to the new, second location prior to said user-unlock-input;

provide for presentation of the first sensory scene with a change in one or both of:
i) the orientation of the second sensory scene relative to the user to correspond to the new, second orientation and
ii) the location of the second sensory scene relative to the user to correspond to the new, second location.

Accordingly, presentation of the first sensory scene may be changed to correspond to the point of view location and orientation of the second sensory scene. This may appear to the user to be the first sensory scene catching up to their current location/orientation when the user-unlock-input was provided. It will be appreciated that in other examples, the presentation of the second sensory scene is changed to correspond to the point of view position and orientation of the first sensory scene. This may appear to the user to be returning to the location/orientation when the user-lock-input was provided.

Figure 6:
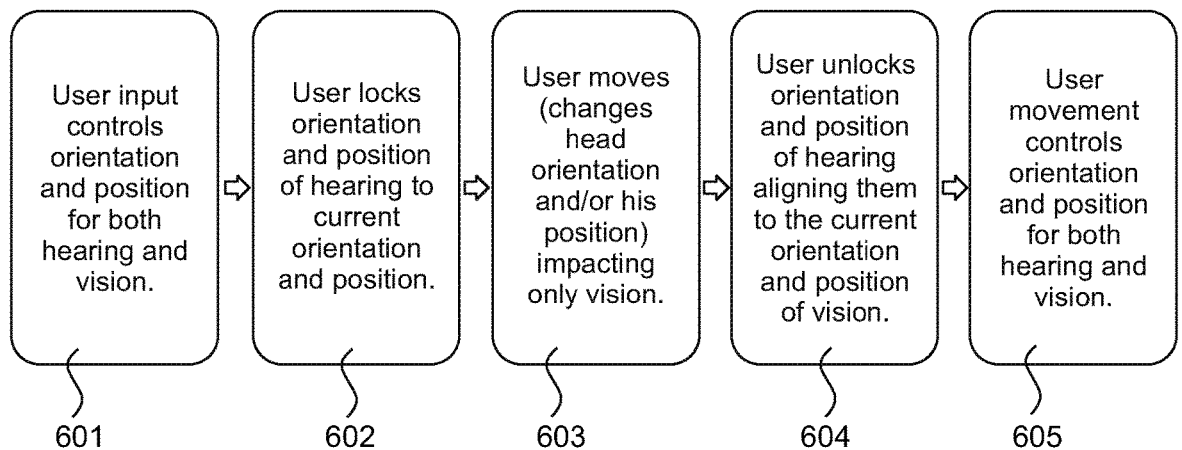
FIG. 6 shows an example flowchart illustrating an example process followed when locking the audio scene.

The example of FIG. 6 comprises a flowchart illustrating the process shown in FIGS. 2 and 4. The example of FIG. 7 comprises a flowchart illustrating the process shown in FIGS. 3 and 5. While these flowcharts illustrate the locking of the visual sensory scene or the audio scene, any other sensory scene, such as the tactile scene, olfactory scene or taste scene may be similarly locked as illustrated in the examples above and the flowcharts. The examples above illustrate the locking of one sensory scene at any one time but it will be appreciated that in one or more examples, a plurality of sensory scenes may be locked simultaneously or at separate times. Thus, a plurality of locked sensory scenes may be locked (i) with the same orientation or at the same location in the virtual space; or (ii) with a different orientation or at a different location in the virtual space.

FIG. 6 shows, in step 601, "normal" operation in which user input to move location or orientation controls the presentation orientation and presentation location for all sensory scenes, or in this example, both an audio scene and the visual scene. Step 602 shows the user providing the user-lock-input to lock the presentation of the audio scene as heard from the current position and with the current orientation in the virtual space. Step 603 shows the user providing user input to change their orientation and/or location in the virtual space, which provides for a change in the presentation orientation and/or presentation location of only the visual scene in accordance with the user input because the audio scene is locked. Step 604 shows the user providing the user-unlock-input to unlock the presentation of the audio scene such that presentation of the audio scene is changed so that it is heard from the current location and with the current orientation in the virtual space to align with the visual scene. Step 605 shows "normal" operation once again in which user input to move location or orientation in the virtual space controls the presentation orientation and position for all sensory scenes.

Figure 7:
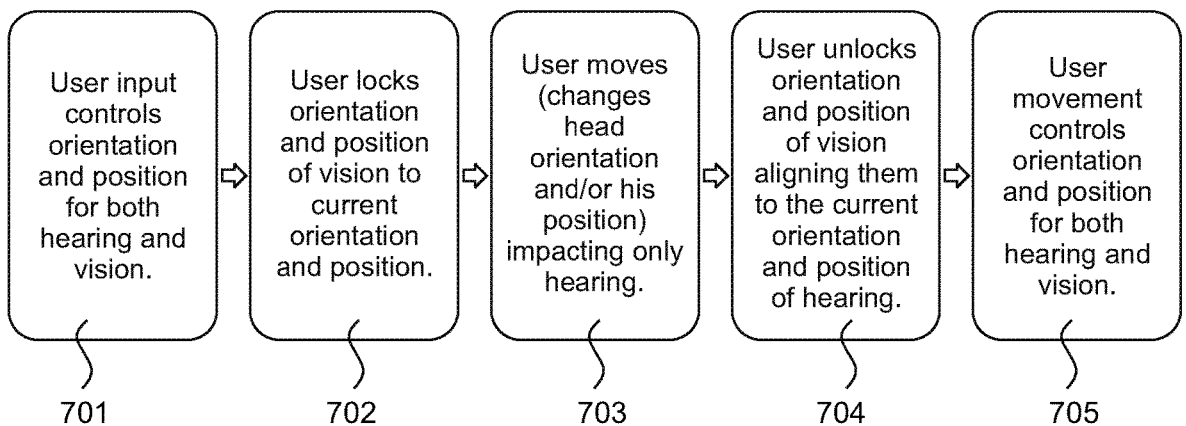
FIG. 7 shows an example flowchart illustrating an example process followed when locking the visual scene.

FIG. 7 shows, in step 701, "normal" operation in which user input to move location or orientation controls the presentation orientation and presentation location for all sensory scenes, or in this example, both an audio scene and the visual scene. Step 702 shows the user providing the user-lock-input to lock the presentation of the visual scene as displayed from the current position and with the current orientation in the virtual space. Step 703 shows the user providing user input to change their orientation and/or location in the virtual space, which provides for a change in the presentation orientation and/or location of only the audio scene in accordance with the user input because the visual scene is locked. Step 704 shows the user providing the user-unlock-input to unlock the presentation of the visual scene such that presentation of the visual scene is changed so that it is displayed from the current location and with the current orientation in the virtual space to align with the audio scene. Step 705 shows "normal" operation once again in which user input to move location or orientation in the virtual space controls the presentation orientation and position for all sensory scenes.

Figure 8:
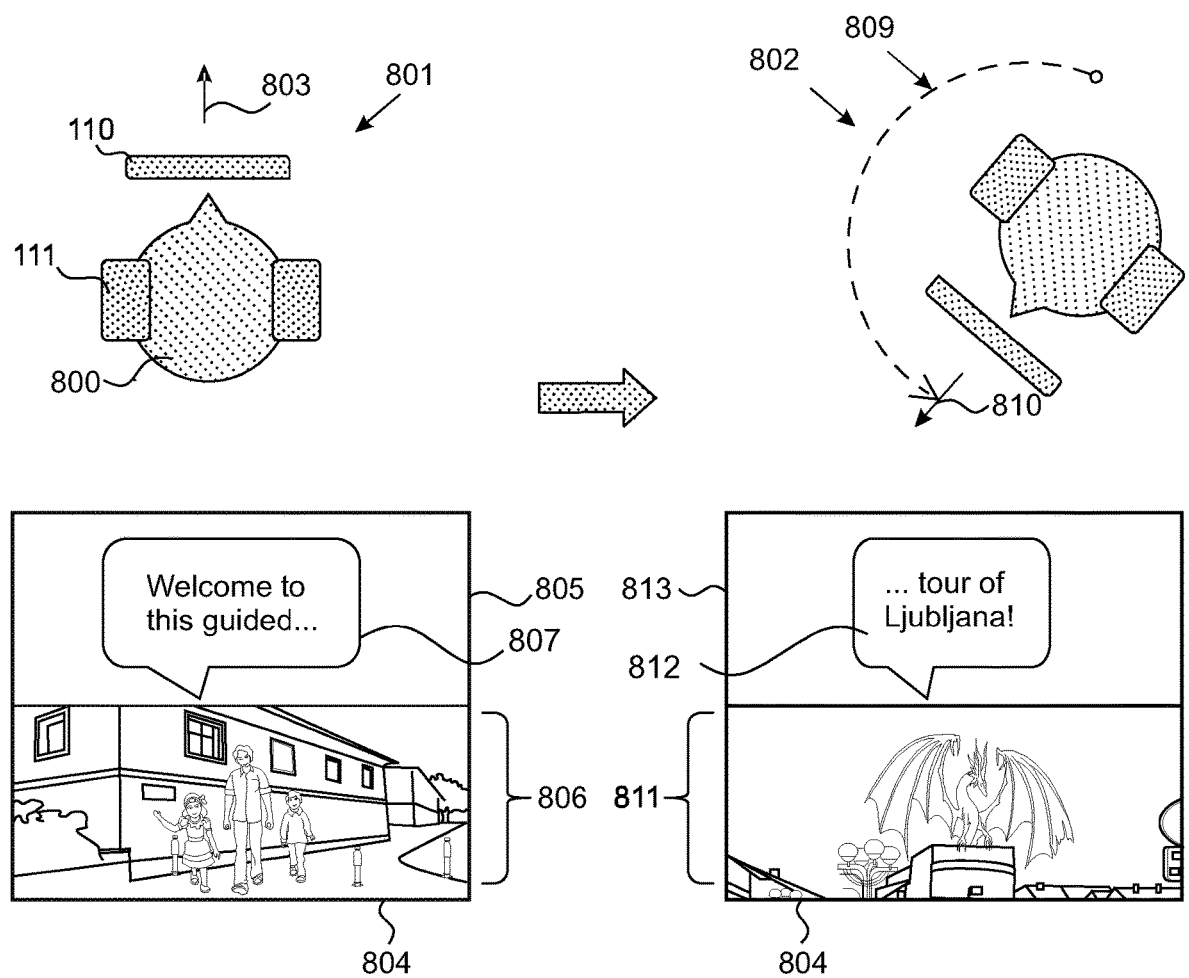
FIG. 8 shows a first practical example of locking one of the sensory scenes.
Figure 9:
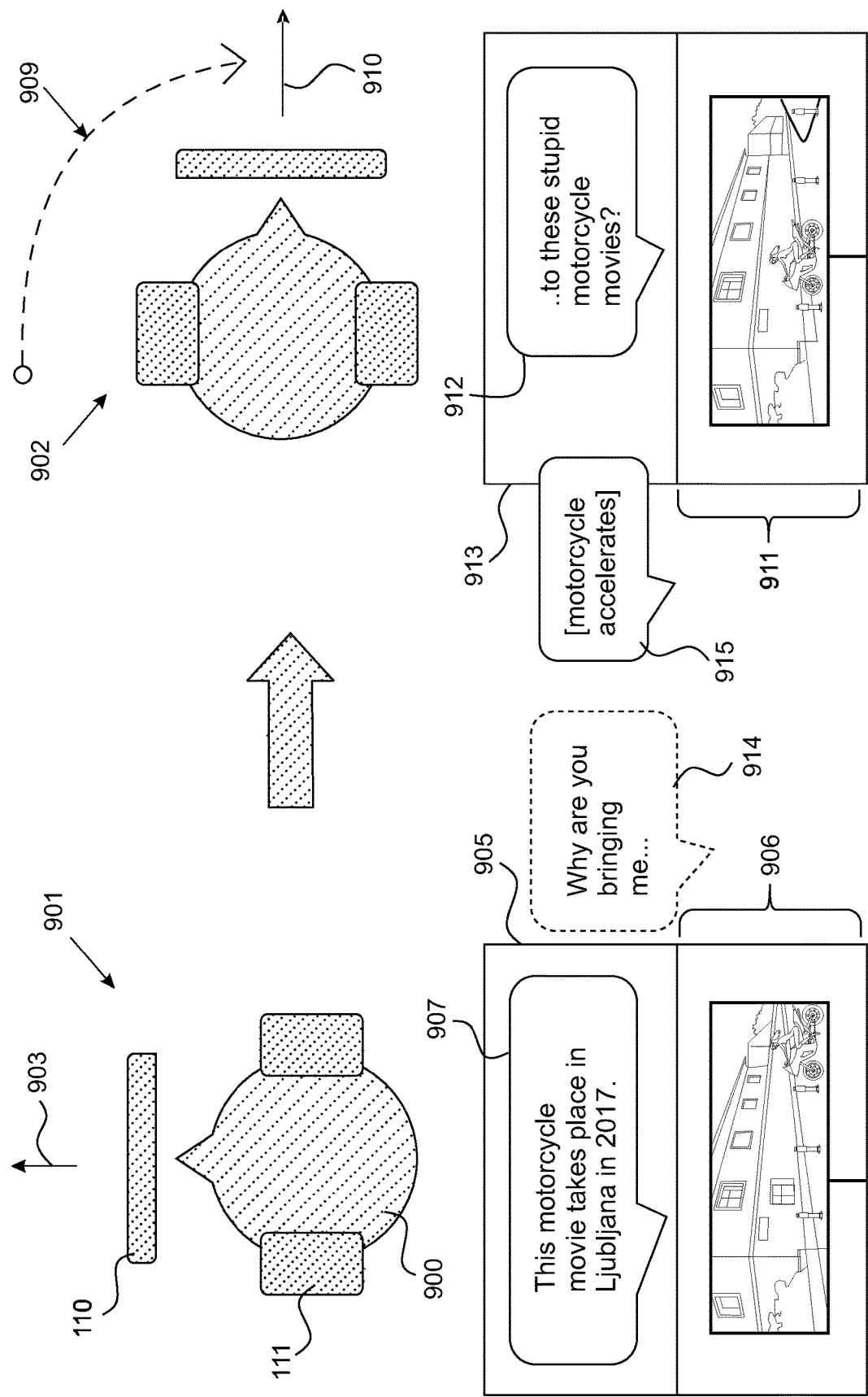
FIG. 9 shows a second practical example of locking one of the sensory scenes.
Figure 10:
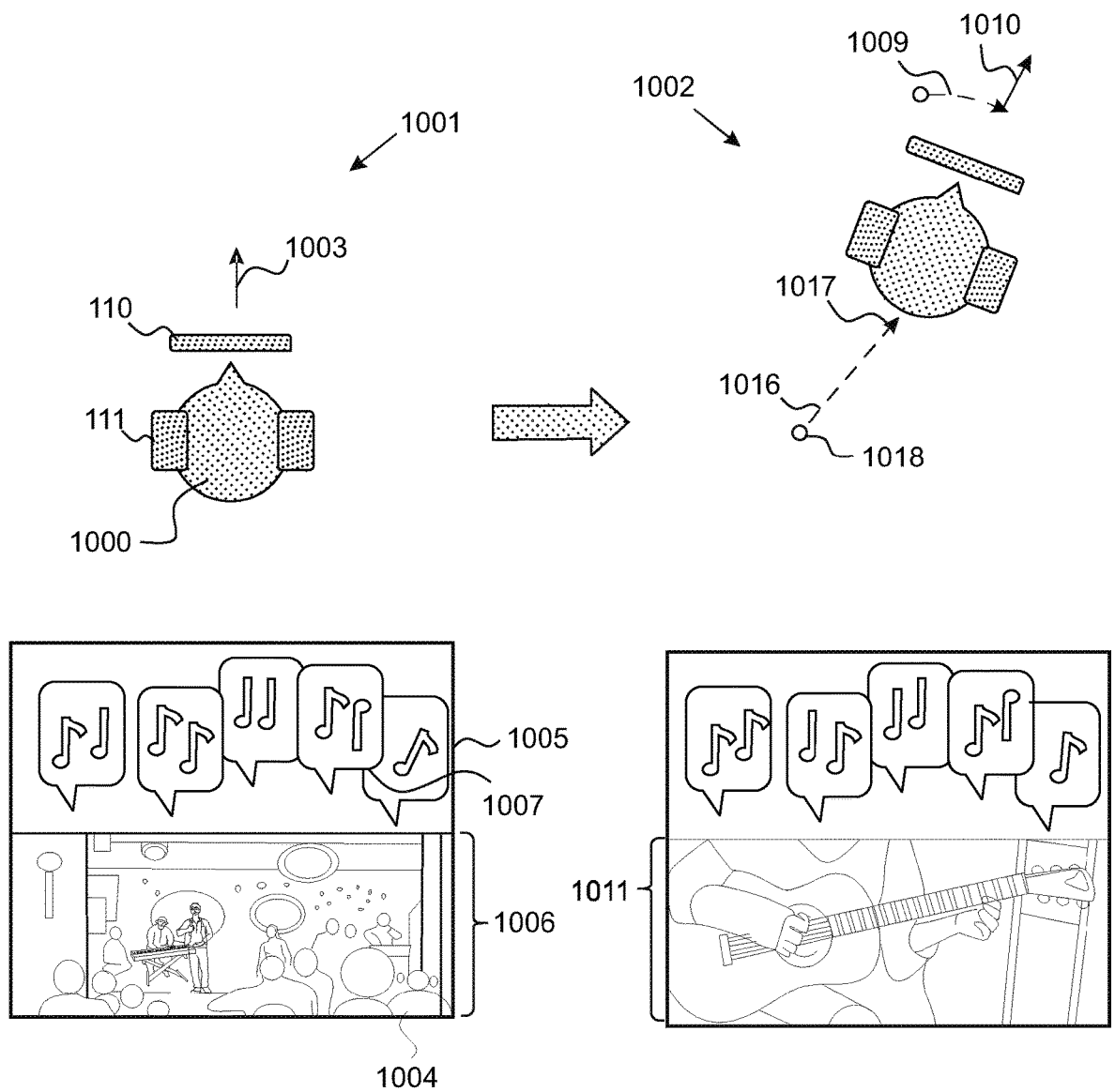
FIG. 10 shows a third practical example of locking one of the sensory scenes.

FIGS. 8 to 10 show practical examples of the apparatus 101 providing for locking of one of the sensory scenes while providing for a change in the presentation of other sensory scenes in accordance with changes in position or orientation in the virtual space.

FIG. 8 shows the user experiencing a virtual tour of the city of Ljubljana. The left-hand side of FIG. 8 shows the situation before 801 providing the user-lock-input and the right-hand side shows the situation after 802 the user-lock-input and movement in the virtual space. The before situation 801 shows the user 800 oriented in the virtual space in direction 803. The visual scene and the audio scene are presented in accordance with the orientation 803. The user's view of the visual scene is shown at 804. Accordingly, the user is provided with a spatial sub-portion of the total visual extent of the visual scene comprising a view 806. A representation of the audio scene is shown at 805. Thus, speech bubbles in the box marked by 805 comprise audio perceived to be heard from a straight-ahead direction in the region of the user's visual view. Speech bubbles outside the box 805 designate audio perceived to be heard from locations outside the current field of view of the user, such as to the side or behind the user.

View 806 shows a tour guide and other tourists listening to the tour guide. The speech bubble 807 illustrates the user hearing the tour guide saying "Welcome to this guided . . . " from a location aligned with the visual image of the tour guide.

The user 800 may wish to continue to listen to the tour guide but look around the visual scene. Looking away from the tour guide would, during normal operation, change the presentation direction of the audio scene, which may comprise the audiological straight ahead direction, which may decrease the volume or affect how well the user may concentrate on what the tour guide is saying. Thus, while the user may still be able to hear the guide when looking away from the tour guide's location, because the tour guide is not in front of the user, other audio in the audio scene may drown out the tour guide.

The user may therefore provide the user-lock-input to lock the audio scene with a presentation orientation in accordance with orientation 803. The user may then provide the user-input to change their orientation in the virtual space and thereby look elsewhere in the visual scene, while not affecting presentation of the locked, audio scene. The after situation 802, shows the user having changed their orientation as shown by arrow 809 so that they are oriented in direction 810 in the virtual space.

The view 811 is therefore changed to correspond to the change in orientation to direction 810. The visual scene may therefore be presented with the presentation orientation corresponding to direction 810. However, the audio scene is locked and therefore the user-input to change orientation as shown by arrow 809 does not affect the audio scene. The presentation orientation of the audio scene may therefore correspond to the direction 803. Speech bubble 812 represents the continued monologue of the tour guide saying " . . . tour of Ljubljana!" and its presence in box 813 illustrates it remains to be heard from a perceived direction in front of the user within their field of view, even though the visual scene no longer shows the tour guide, but instead shows a different part of the visual scene.

Accordingly, the apparatus 101 provides for a user to maintain focus on a part of the audio scene by locking the audio scene so that the audio scene is heard from a first location/orientation in the virtual space while changing the user location/orientation in the virtual space so that a different part of the visual scene can be viewed.

FIG. 9 shows a second practical example with a similar illustration of user orientation in the virtual space and what presented to the user as shown in the FIG. 8. The same reference numerals have been used where appropriate, but they begin at 900 rather than 800. In this example, the user is watching VR content of a motorcycle movie. The user's friend is sitting next to them, in the real world, to their right also watching the same VR content on their VR apparatus. The audio of the audio scene is shown in solid line speech bubbles while the audio from the real-world friend is shown in dashed line speech bubbles.

The before situation 901 shows the user oriented in direction 903 in the virtual space. The visual scene and the audio scene are presented in accordance with the orientation 903. The presentation orientation of the visual and audio scenes may correspond to direction 903. Accordingly, the view 906 shows the view of motor cycle movie on a big screen. The audio from the VR content is shown in speech bubble 907 perceived to be heard from the same direction as the big screen of the visual scene. However, the user's friend is talking to him as shown by speech bubble 914. The speech bubble 914 is outside box 905 illustrating it is heard from the side of the user 900. Their friend's comments begins "Why are you bringing me . . . ". The user may wish to listen to their friend's comments more clearly by turning their head towards their friend but they do not want to miss the visual action of the motor cycle movie in the visual scene.

The user therefore provides the user-lock-input to lock the visual scene such that it continues to be presented in accordance with the orientation 903. The user may then turn their head (which may be configured to provide the user input to change orientation in the virtual space), while not affecting the presentation orientation of the locked, visual scene. The after situation 902, shows the user having changed their orientation as shown by arrow 909 so that they are oriented in direction 910. Accordingly, the user hears their friend's comment, shown by speech bubble 912, front and centre as they have turned towards them. Their friend's comment continues " . . . to these stupid motorcycle movies?". The audio of the audio scene however is presented to correspond to the change in orientation indicated by the user input and therefore the sound of the motorcycle movie, which comprises the audio of a motorcycle accelerating, is perceived to be heard from the user's left hand side, as illustrated by the position of speech bubble 915 being located outside and to the left of box 913. The presentation orientation of the audio scene may now correspond to direction 910. The visual scene shown by view 911 is locked in place corresponding to the orientation 903 meaning that the user did not miss the visual action despite providing the user input to change orientation in the virtual space by virtue of turning their head to hear their friend.

FIG. 10 shows a further practical example of a user watching VR content of a band playing. The same layout and reference numerals as used in FIGS. 8 and 9 have been used in FIG. 10 except the reference numerals begin from 1000. In the before situation 1001, the user has found a position in the virtual space at which the he perceives the audio to sound best. The visual scene and the audio scene may be presented with a presentation location and presentation orientation designated by the position of arrow 903 and its orientation. However, as shown in view 1006, the user is far from the band and therefore the visual view of the band is not to the user's liking.

The user therefore provides the user-lock-input to lock the audio scene as perceived from the location and orientation 1003 in the virtual space i.e. with a presentation orientation and presentation location corresponding to location 1003. The user may then provide the user-input to change their location and orientation in the virtual space and thereby move to a different location in the virtual space and have a different orientation in the virtual space, while not affecting presentation of the locked, audio scene. The after situation 1002, shows the user having changed their orientation by 20 degrees to the right as shown by arrow 1009 so that they are oriented in direction 1010 in the virtual space. The user has also changed their location as shown by arrow 1016 from location 1018 to new location 1017 in the virtual space.

The apparatus 101 therefore provides for changing of the view 1011 to correspond to the change in orientation to direction 1010 as well as the change in location to location 1017. However, the audio scene is locked and therefore the user-input to change location and orientation does not affect the audio scene. The user therefore views the visual scene with a presentation location corresponding to the location 1017 and with a presentation orientation corresponding to arrow 1010. Thus the user has a close up view 1011 of the band, while the audio scene is heard with a presentation location and orientation corresponding to the position 1018 and orientation 1003 and thus the user maintains their perceived best listening position.

In other examples, similar to FIG. 10 the visual scene may be locked such that the apparatus provides the user with a view of the visual scene based on the location 1018 with orientation 1003 and provides the user with a listening position of the audio scene based on the location 1017 with the orientation 1010.

The user-lock-input may be provided in a variety of ways. In one or more examples, the user-input may be provided via a user interface such as a smartphone, keyboard, voice command or eye gaze command. In one or more examples, the user-lock-input is a free space user gesture. An apparatus for detecting free space user gestures may be provided, such as a camera or other sensor, that may notify the apparatus 101 of the gesture or user input provided by the gesture. In one or more examples, the position at which the gesture is performed determines the sensory scene that is locked.

Figure 11:
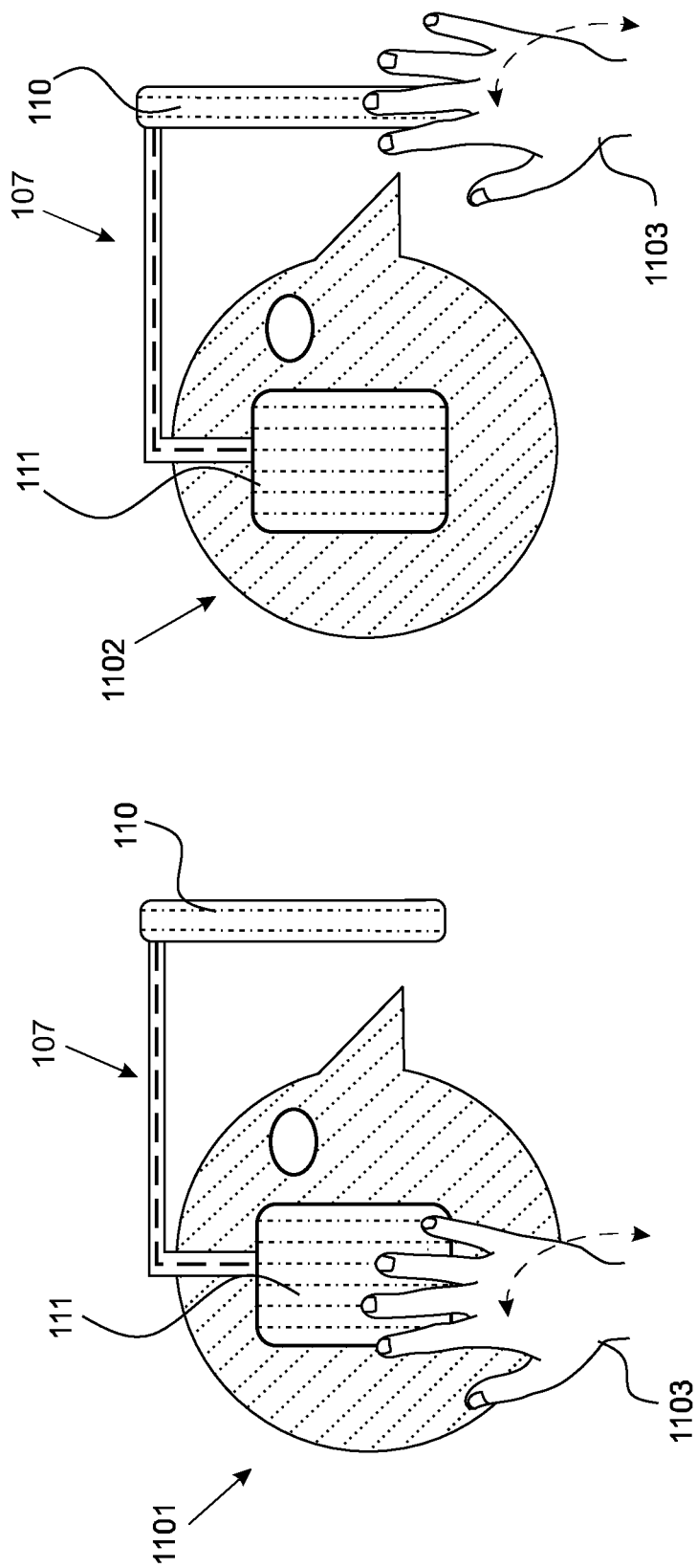
FIG. 11 shows an example user gesture to provide a user-lock-input and, optionally, a user-unlock-input.

FIG. 11 illustrates user gestures for providing a user-lock-input to lock the audio scene labelled 1101 and a user-lock-input to lock the visual scene labelled 1102. The user is shown wearing the headset 107 with the display 110 in front of their eyes and the headphones 111 over their ears.

The gesture shown in 1101 comprises the user lifting their hand 1103 to cover their ear. This may intuitively result in the apparatus 101 providing for locking of the audio scene. The gesture shown in 1102 comprises the user lifting their hand 1103 to their eyes. This may intuitively result in the apparatus 101 providing for locking of the visual scene.

In one or more examples, the user-lock-input for locking the tactile scene comprises a user hand gesture to a position adjacent the user's body or face. In one or more examples, the user-lock-input for locking the olfactory scene comprises a user hand gesture to a position adjacent the user's nose. In one or more examples, the user-lock-input for locking the taste scene comprises a user hand gesture to a position adjacent the user's mouth.

The user-unlock-input may also be provided by a user gesture. In some examples, the raising of the user's hand 1103 a second time may provide the user-unlock-input such that consecutive performances of the user gesture provides the user-unlock-input then the user-lock-input.

In one or more examples, the apparatus 101 is provided with the user-lock-input based on performance of the user hand gesture by the user and the user-unlock-input based on ceasing the performance of the user hand gesture by the user. Thus, the sensory scene is locked for as long as the user performs the corresponding predetermined user gesture.

Figure 12:
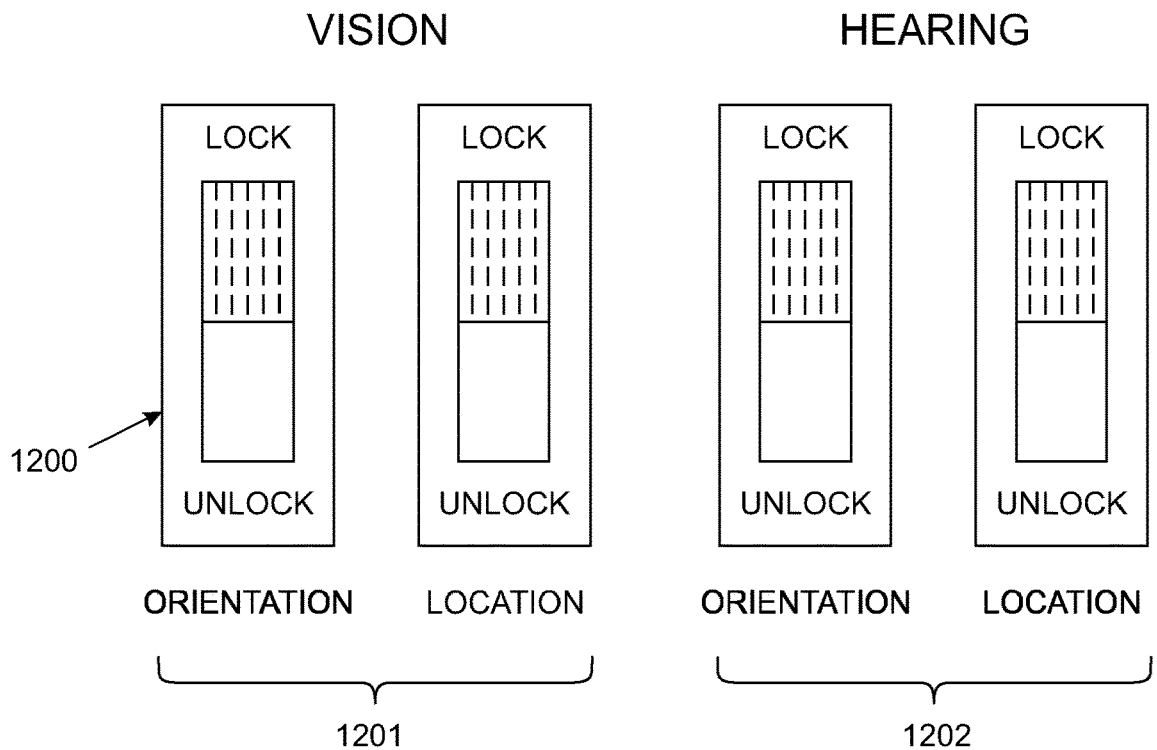
FIG. 12 shows an example virtual interface to provide a user-lock-input and, optionally, a user-unlock-input.

FIG. 12 shows an example of a virtual user interface for locking and unlocking the sensory scenes. Switches 1200 may be provided in the user's view for actuation by a gesture or via other input means. In this example, the apparatus 101 provides a first set 1201 of switches for providing the user-lock-input and user-unlock-input for the first, visual sensory scene and a second set 1202 of switches for providing the user-lock-input and user-unlock-input for the second, audio sensory scene.

In one or more examples, the user-lock-input may be specific to lock the sensory scene against one of changes in orientation in the virtual space and changes in location in the virtual space. Accordingly, the apparatus may be configured, based on provision of user-lock-input specific to user orientation and based on user input to change both of the orientation and location of the user in the virtual space, provide for presentation of the sensory scene with changes to correspond to the change in location in the virtual space but without changes to correspond to the change in orientation in the virtual space. Likewise, the apparatus may be configured, based on provision of user-lock-input specific to user location and based on user input to change both of the orientation and location of the user in the virtual space, provide for presentation of the sensory scene with changes to correspond to the change in user orientation in the virtual space but without changes to correspond to the change in user location in the virtual space.

In one or more examples, the user may wish to change the orientation with which, or location from which, they experience the locked, first sensory scene. Thus, in the examples described above, the locked sensory scene is presented in a way corresponding to the user location and user orientation in the virtual space at the time the user-lock-input was provided. However, the user may wish to adjust this "locked" location or "locked" orientation. For example, the user may have provided the user-lock-input while located or oriented offset from their intended location or orientation and thus they may want to correct this without providing the user-unlock-input. As another example, if the visual scene was locked, an important feature may be just out of view, which the user may only notice once they have moved away from the locked location or locked orientation. In other examples, as time goes by, objects may move in the visual imagery and therefore the user may need to adjust their locked view of the visual scene to maintain the objects within the user's view.

Accordingly, in one or more examples, the apparatus 101 may be responsive to second user-input to adjust presentation of the locked, first sensory scene such that the locked, first sensory scene is presented corresponding to one or both of an adjusted location and adjusted orientation in the virtual reality space determined based on the second user-input, the second user-input different to the user-input to change one or more of user location and user orientation in the virtual space.

The user-input to change one or more of user location and user orientation in the virtual space may be provided by real-world user movement and real world user head or body rotation respectively. The second user-input to adjust presentation of the locked, first sensory scene may be provided by a different input device, such a hand-held controller or smart phone.

The apparatus 101, based on the second user-input may provide for presentation of the locked first sensory scene with a corresponding change in the first sensory scene relative to the user corresponding to said second user-input. The second user input may provide for adjustment of the locked location and locked orientation in the virtual space from which the locked first sensory scene appears to be presented and therefore the apparatus 1010 may present the locked first sensory scene to represent the user being at the adjusted location and/or having the adjusted orientation.

Figure 13:
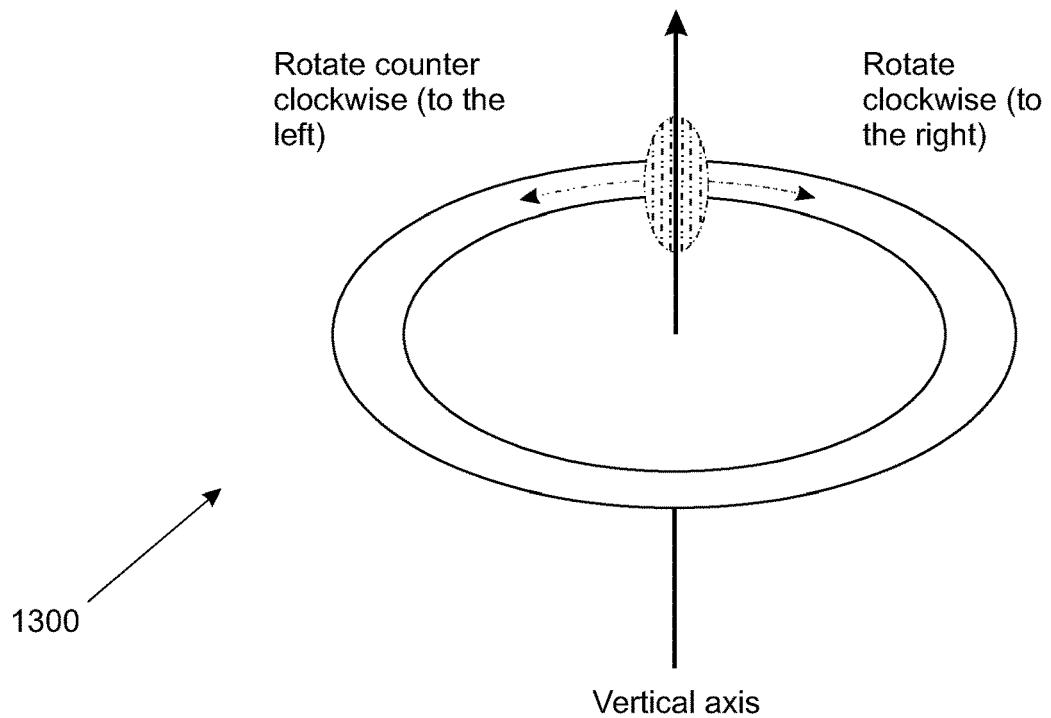
FIG. 13 shows an example device for providing a second user-input to change the presentation orientation of a locked sensory scene.

FIG. 13 shows a rotary controller 1300 for providing the second user-input. The rotary controller 1300 may be hand-held and rotated by the user. The apparatus 101 may provide for adjustment of the presentation of the first, locked sensory scene to account for the change in orientation indicated by the rotation of the rotary controller.

Figure 14:
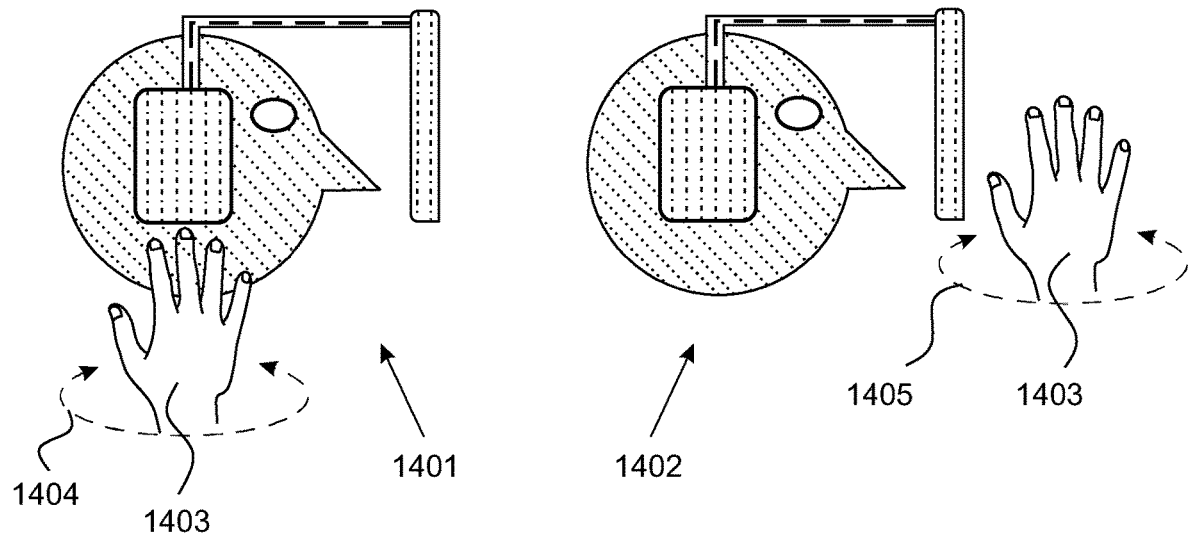
FIG. 14 shows example gestures for providing a second user-input to change the presentation orientation of a locked sensory scene.

FIG. 14 shows a second and third example of a second user-input to provide for adjustment of the presentation of the first, locked sensory scene.

Example 1401 shows the user hand gesture to provide the user-lock-input of the audio scene. Accordingly, the user's hand 1403 has been placed adjacent the user's ear. The second user-input comprises the user rotating their hand as represented by arrow 1404. The second user-input, in this and other examples may provide for presentation of the locked first sensory scene with a corresponding change in orientation relative to the user. Thus, rotation of the user's hand to the left may simulate the user having turned to the left while being presented with the locked audio sensory scene. Rotation of the user's hand to the right may simulate the user having turned to the right while being presented with the locked audio sensory scene. Accordingly, the hand rotation 1403 may provide for adjustment in the presentation of the audio scene to account for a change in orientation of the user relative to the audio scene based on the second-user-input.

Example 1402 shows a similar example to 1401, but the second-user input provides for adjustment of the presentation of the fixed visual scene. Example 1402 shows the user hand gesture to provide the user-lock-input of the visual scene. Accordingly, the user's hand 1403 has been placed adjacent the user's eyes. The second user-input comprises the user rotating their hand as represented by arrow 1405. The second user-input, in this and other examples may provide for presentation of the locked first sensory scene with a corresponding change in orientation relative to the user. Thus, rotation of the user's hand to the left may simulate the user having turned to the left while being presented with the locked visual sensory scene. Rotation of the user's hand to the right may simulate the user having turned to the right while being presented with the locked audio visual scene. Accordingly, the hand rotation 1403 may provide for adjustment in the presentation of the visual scene to account for a change in orientation of the user relative to the visual scene based on the second-user-input. Accordingly, despite the sensory scene being locked, the alternate, second user-input may provide for adjustment in the presentation of the sensory scene.

While FIG. 14 illustrates second user input for adjustment of locked visual and audio scenes, similar input may be provided for adjustment of any other sensory scene, such as the tactile scene, olfactory scene or taste scene. Thus, in one or more examples, a rotation of the hand gesture when the hand is placed adjacent the user's nose may provide for adjustment of the olfactory scene. In one or more examples, a rotation of the hand gesture when the hand is placed adjacent the user's mouth may provide for adjustment of the taste scene. In one or more examples, a rotation of the hand gesture when the hand is placed adjacent the user's body or chest or face may provide for adjustment of the tactile scene.

A third user input may be provided to change the presentation location of a locked sensory scene. For example, with reference to FIG. 14, pointing in a particular direction may provide for translation of the presentation location of the locked sensory scene. Other gestures or other input means may be used for the third user input.

In one or more examples, the apparatus 101 may be configured to provide an indication to the user to identify when the first sensory scene is locked. The indication may indicate which sensory scene is locked. In one or more examples, the indication comprises one or more of a visual indication, audio indication and indication using the sense associated with the first sensory scene. Thus, if the visual scene is locked then a visual indication may be provided. If the audio scene is locked, a predetermined audio tone or announcement or sound effect may be provided.

The indication may take various forms and provide various levels of detail to the user.

Figure 15:
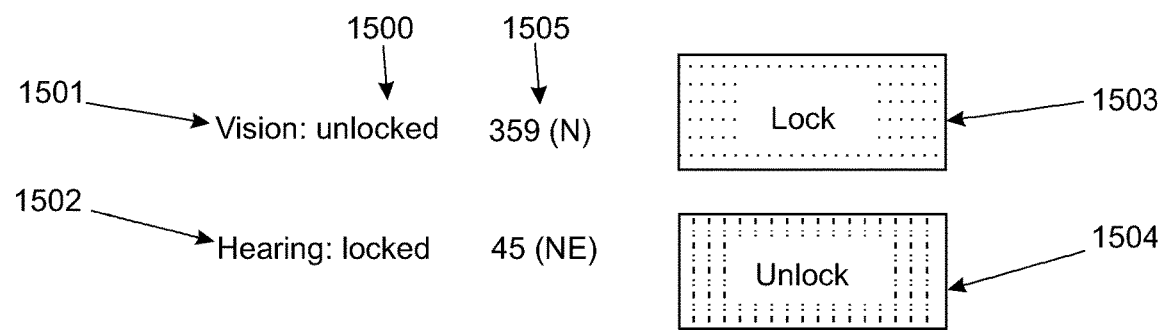
FIG. 15 shows a first example visual indicator to show when the sensory scenes are locked.

The example of FIG. 15 shows a graphical indication 1500. The status of each sensory scene comprising one of "locked" or "unlocked" at 1501 and 1502 may be shown as part of the indication 1500. The indication 1500, in this example, also includes a graphical virtual user interface in the form of buttons 1503, 1504 for providing the user-lock-input or user-unlock-input on actuation thereof.

The indication 1500, in this example, provide an indication of the presentation orientation of the sensory scene, in the form of an angle shown at 1505. Thus, in this example, the visual scene is presented as if the user were oriented at 359 degrees to a reference direction. In this example, the audio scene is presented as if the user were oriented at 45 degrees to the same reference direction.

Figure 16:
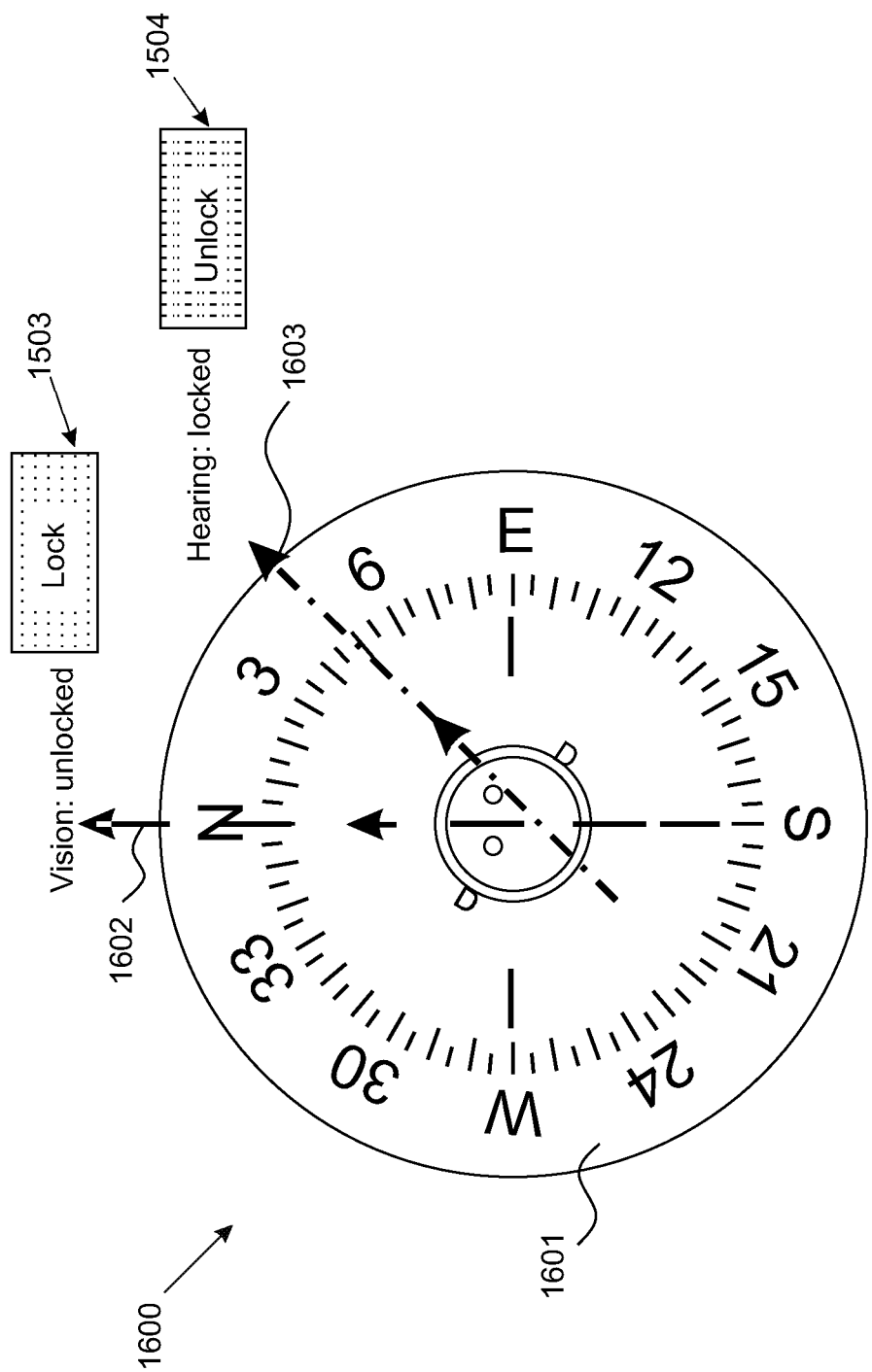
FIG. 16 shows a second example visual indicator to show when the sensory scenes are locked.

The example of FIG. 16 shows a second example of an indication 1600. In this example, rather than comprising textual indication of the presentation orientations of the respective sensory scenes, they are presented graphically on a compass 1601 with pointers 1602, 603. Similar to FIG. 15, buttons 1503, 1504 are provided.

The indications 1500, 1600 may be provided on provision of the user-lock-input or all of the time. In other examples, the indication may show the relative presentation locations of the sensory scenes as well as (or instead of) the presentation orientation. The presentation locations may be plotted on a map of the virtual space.

Figure 17:
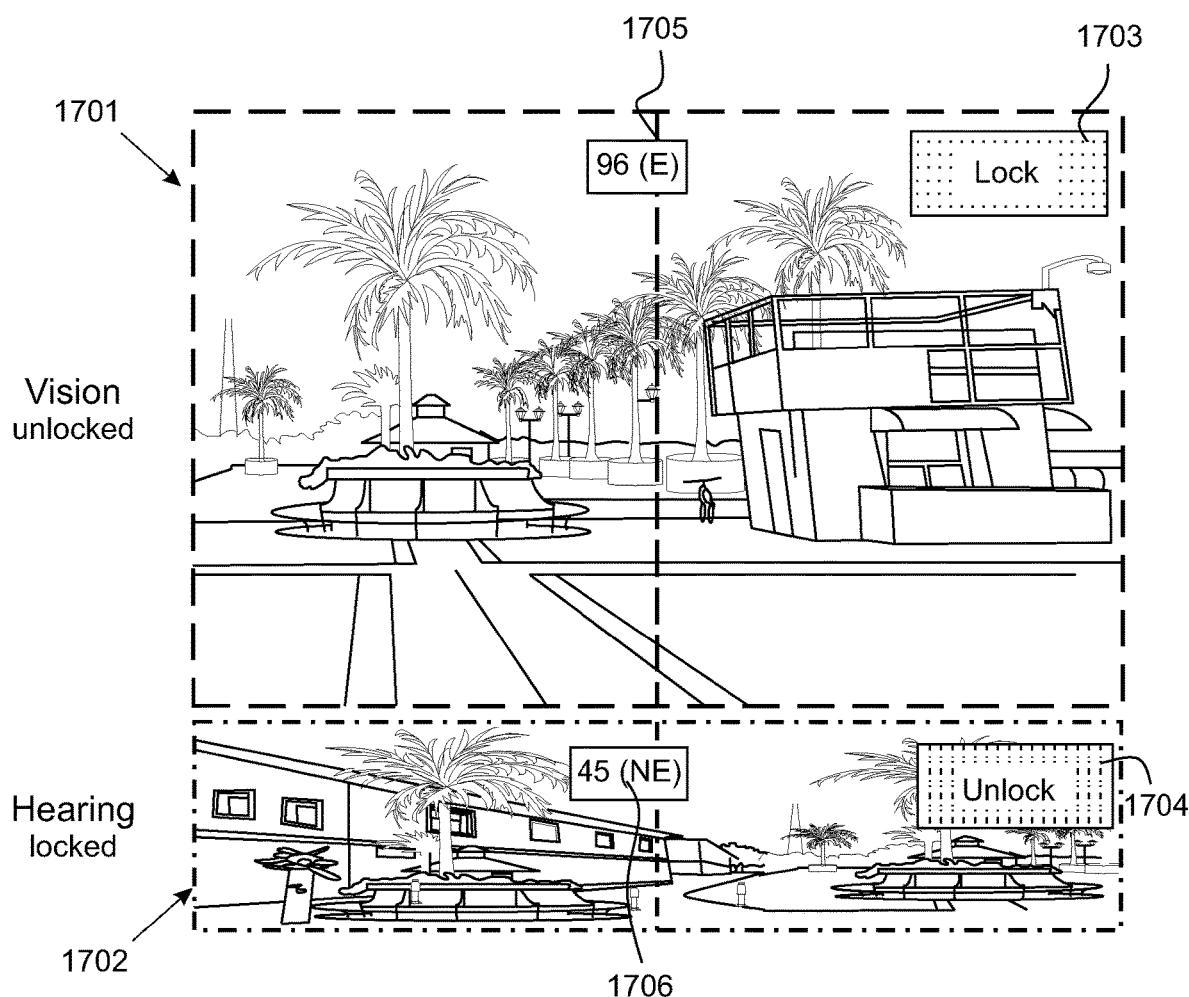
FIG. 17 shows an example split screen arrangement for showing the visual scene corresponding to the orientation and position in the virtual space and the visual scene corresponding to a locked sensory scene.

The example of FIG. 17 illustrates the use of a split screen view for showing one or both of the presentation orientation and presentation location of the two or more sensory scenes. Thus, the split screen configuration may comprise a plurality of views of the visual scene, each view corresponding to a presentation orientation and presentation location of one of the sensory scenes. Thus, for the audio scene, the visual scene with corresponding presentation orientation and presentation location may be provided.

FIG. 17 shows a first view 1701 which represents the user's current view of the visual scene as they provide user input to change their location and orientation in the virtual space. In this example, the audio scene is locked. The second view 1702 shows the visual scene at the locked, presentation location and presentation orientation of the locked audio scene. Accordingly, the second view provides the user with a visual reference of the audio scene they are hearing. In this example the second view 1702 thus shows that the user is hearing audio of the audio scene with the audiological straight ahead direction corresponding to the visual scene shown in view 1702. However, the user is currently looking at the visual scene as shown in view 1701.

The second view may be static. However, as described above, the user may provide second and/or third user-input to change the presentation location and presentation orientation of a locked sensory scene. The apparatus 101, based on provision of the second user-input to change the presentation orientation of the locked audio scene may provide for display of the visual scene in the second view 1702 having a corresponding presentation orientation. The apparatus 101, based on provision of the third user-input to change the presentation location of the locked audio scene may provide for display of the visual scene in the second view 1702 having a corresponding presentation location. Accordingly, the user may be able to see what affect their adjustments to the presentation of the locked sensory scene are having based on a corresponding view of the visual scene provided in the second view 1702.

In this example, the second view is provided in a lower second of the user's view provided on the displays 110. In other examples the second view may be provided towards the bottom of the virtual space such that the user need to look down to see the second view 1702 but when they look up, the second view is out of their field of view.

The first view and second view 1701, 1702 may be provided with virtual buttons 1703, 1704 to actuate to provide the user-lock-input and user-unlock-input. The presentation orientation may also be shown, at 1705, 1706 for the sensory scene that is represented in each view 1701, 1702.

In other examples, when the user provides for locking of the visual scene, user input to change orientation and/or location in the virtual space will only affect the presentation of sensory scenes other than the locked visual scene. While this may be desirable, it may be difficult for the user to change their position and orientation relative to the other sensory scenes as desired. Thus, a user may be required to navigate by sound, smell, taste or tactile stimuli which may be difficult.

Accordingly, in one or more examples, the apparatus 101 may provide for temporarily showing a view of the visual scene corresponding to the current location and/or orientation of the user in the virtual space despite the visual scene being locked to aid the change in presentation location/orientation with respect to the other sensory scenes.

The temporary view of the visual scene from the current location and/or orientation of the user in the virtual space may be provided at times when the user input to change current location and/or orientation is provided. When the user input is not provided, the temporary view may be removed from display and the locked visual scene may be displayed. The temporary view may be ghosted or partially transparent and the locked visual scene may be displayed beneath it.

Thus, the user-lock-input to lock the first sensory scene may be provided with the user having one or both of a first orientation and a first location in the virtual space. The apparatus 101 may provide for, in the absence of user-input to change user orientation in the virtual space and a user-input to change user location in said virtual space, presentation of the first, visual sensory scene based one or both of the first orientation and the first location relative to the user such that the visual scene may be presented with a presentation orientation and a presentation location corresponding to said first orientation and first location. Thus, in the absence of the user input the visual scene is locked.

However, the apparatus 101 may provide for, on receipt of one or both of a user-input to change user orientation in the virtual space and a user-input to change user location in said virtual space, presentation of the second sensory scene with a corresponding change in one or both of the orientation and location of the second sensory scene relative to the user; and temporary presentation of the first sensory scene with a corresponding change in one or both of the orientation and location of the second sensory scene relative to the user until said user-input is no longer provided. Thus, the user is able to navigate the virtual space using the visual scene but when they stop moving in said virtual space, the locked visual scene with the first location/first orientation is shown.

Figure 18:
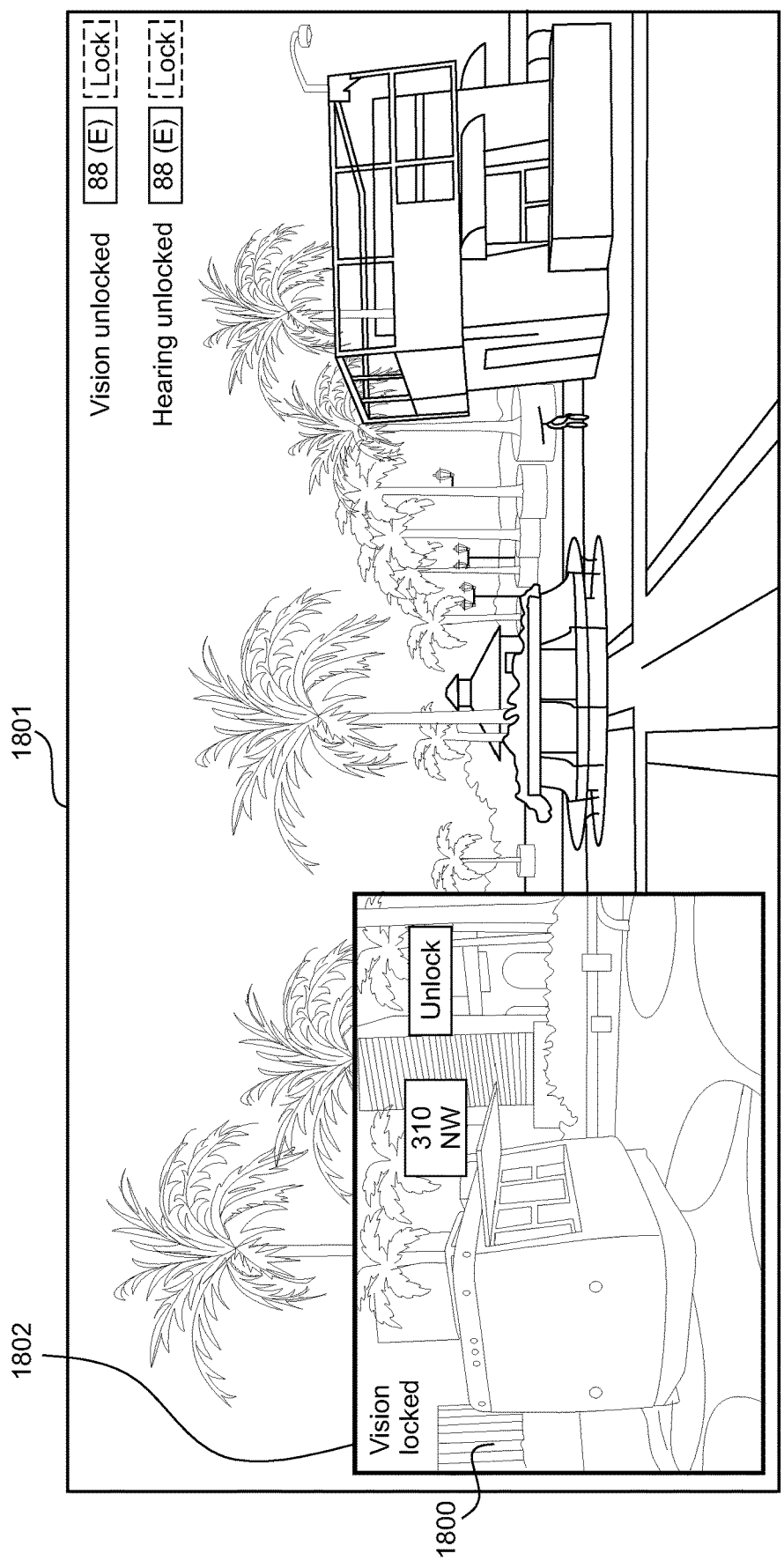
FIG. 18 shows the locking of a sub-region of the visual scene.

The example of FIG. 18 shows the user having provided a user-lock-input for a sub-region 1800 of the visual scene rather than the whole visual scene, as described in previous examples. The sub-region may be user-defined based on a user gesture or other user input. The sub-region may comprise a central or other predetermined area of the users view of the visual scene.

The apparatus 101 may be caused provide for, based on one or both of a user-input to change user orientation in the virtual space and a user-input to change user location in said virtual space with two views 1801 and 1802 of the visual scene and presentation of the second sensory scene as follows:

i) presentation of the second sensory scene e.g the audio scene with a corresponding change in one or both of the presentation orientation and presentation location of the second sensory scene relative to the user;

ii) presentation of the first sensory scene in a first view 1801 with a corresponding change in one or both of the presentation orientation and presentation location of the first sensory scene relative to the user; and iii) presentation of the first sensory scene in a second view 1802, the second view showing the defined sub-region with no change in the presentation orientation and presentation location of the visual content of the first sensory scene relative to the user.

Accordingly, the second view 1802 showing the locked sub-region of the visual scene may be used to keep an eye on a particular part of the visual scene while the user explores the remainder of the visual scene using the first view 1801.

Figure 19:
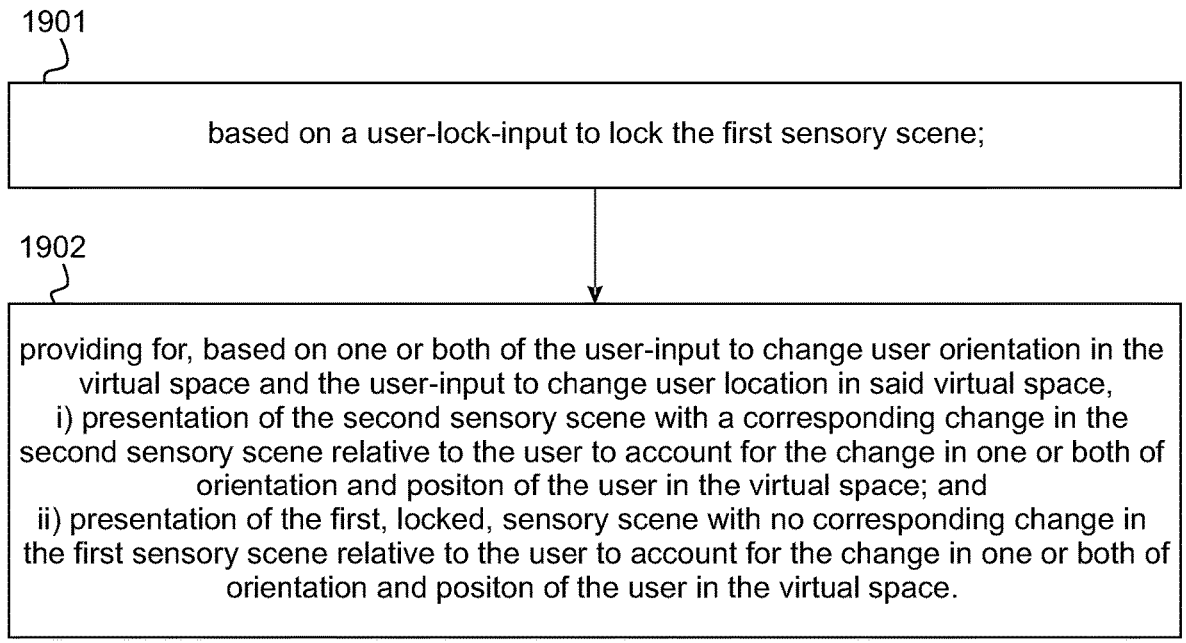
FIG. 19 shows a flowchart illustrating an example method.

FIG. 19 shows a flow diagram illustrating the steps of, based on 1901 a user-lock-input to lock the first sensory scene;

providing for 1902, based on one or both of the user-input to change user orientation in the virtual space and the user-input to change user location in said virtual space, i) presentation of the second sensory scene with a corresponding change in the second sensory scene relative to the user to account for the change in one or both of orientation and position of the user in the virtual space; and ii) presentation of the first, locked, sensory scene with no corresponding change in the first sensory scene relative to the user to account for the change in one or both of orientation and position of the user in the virtual space.

Figure 20:
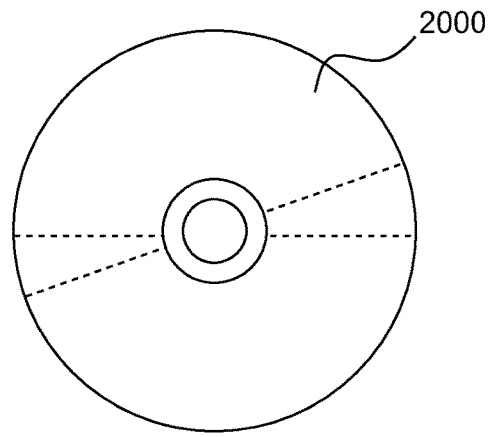
FIG. 20 shows a computer readable medium.

FIG. 20 illustrates schematically a computer/processor readable medium 2000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising
   at least one processor; and
   at least one non-transitory memory including computer program code;
   the at least one memory and the computer program code configured to, with the at least one processor, cause the apparatus at least to perform:
      provide for presentation of virtual-or-augmented reality content comprising data to provide a virtual space in which to present a first sensory scene and a second, different sensory scene as one of virtual reality or augmented reality to a user having a location and orientation in the virtual space, the sensory scenes comprising content for presentation to the user at least from one of specific directions or specific locations in the virtual space, the sensory scenes selected from:
         a visual scene for presenting visual content,
         an audio scene for presenting audio content,
         a tactile scene for presenting touch stimuli content,
         an olfactory scene for presenting olfactory stimuli content, or
         a taste scene for presenting taste stimuli content,
      the sensory scenes defined relative to the virtual space such that one or both of a user-input to change user orientation in the virtual space or a user-input to change user location in the virtual space provides for a corresponding change in presentation of at least the first and second sensory scenes relative to the user to account for the orientation and location of the user in the virtual space;

provide for locking of the first sensory scene based on a user-lock-input to maintain at least one of a current user orientation or a current user location for the first sensory scene; and in response to the user-lock-input and receipt of at least one of the user-input to change the user orientation in the virtual space or the user-input to change the user location in the virtual space, provide for:

presentation of the second sensory scene with a corresponding change in the second sensory scene relative to the user to account for the change in one or both of the orientation or the location of the user in the virtual space; and presentation of the first, locked, sensory scene with no corresponding change in the first sensory scene relative to the user to account for the change in one or both of the orientation or the location of the user in the virtual space.

2. An apparatus according to claim 1, wherein the first sensory scene comprises one of the visual scene or the audio scene and the second sensory scene comprises the other of the visual scene or the audio scene.

3. An apparatus according to claim 1, wherein based on a user-unlock-input to unlock the first sensory scene, and the apparatus having received user-input to change one or both of the user orientation in the virtual space to a new orientation or the user location in the virtual space to a new location prior to the user-unlock-input, the at least one memory and the computer program code are configured to, with the at least one processor, cause the apparatus to perform:

provide for presentation of the first sensory scene with a change in one or both of:

the orientation of the first sensory scene relative to the user to correspond to the new orientation or the location of the first sensory scene relative to the user to correspond to the new location.

4. An apparatus according to claim 1, wherein the user-lock-input comprises one or more of:

a user gesture specific to the first sensory scene; or a user actuation of a user interface specific to the first sensory scene.

5. An apparatus according to claim 3, wherein the apparatus is provided with the user-lock-input based on performance of a user hand gesture by the user and the apparatus is provided with the user-unlock-input based on ceasing the performance of the user hand gesture by the user.

6. An apparatus according to claim 5, wherein, based on movement of the user's hand during performance of the user hand gesture, the at least one memory and the computer program code are configured to, with the at least one processor, cause the apparatus to perform:

provide for presentation of the locked first sensory scene with a change in one or both of the orientation or the location of the first sensory scene relative to the user corresponding to the movement of the user's hand.

7. An apparatus according to claim 1, wherein the apparatus is configured to provide an indication to the user to identify when the first sensory scene is locked.

8. An apparatus according to claim 1, wherein, based on the first sensory scene being locked, the at least one memory and the computer program code are configured to, with the at least one processor, cause the apparatus to perform:

provide for, based on one or both of:

a second user-input, different to the user-input to change user orientation in the virtual space or a third user-input, different to the user-input to change user location in the virtual space, presentation of the locked first sensory scene with a change in one or both of the orientation or the location of the first sensory scene relative to the user corresponding to the second user-input and/or the third user-input.

9. An apparatus according to claim 1, wherein the apparatus is caused to provide for presentation of a graphical indicator showing one or both of relative orientations of the first sensory scene and the second sensory scene or relative positions of the first sensory scene and the second sensory scene at least at some time after receipt of the user-lock-input.

10. An apparatus according to claim 1, wherein the apparatus is caused to provide for display of a first view of the visual scene in the virtual space and a second view of the visual scene in the virtual space in a split screen arrangement, the first view showing a view of the user having an updated location and orientation in the virtual space and the second view showing the view of the user having the current user location or the current user orientation in the virtual space corresponding to a time of receipt of the user-lock-input.

11. An apparatus according to claim 1, wherein the first sensory scene comprises the visual scene presented in the virtual space for viewing by the user, the user provided with a view comprising a sub-portion of the visual scene at any one time; and wherein the user-lock-input includes a definition of a sub-region of the view of the visual scene; and wherein the apparatus is caused to provide for, based on one or both of the user-input to change the user orientation in the virtual space or the user-input to change the user location in the virtual space:

presentation of the second sensory scene with the corresponding change in one or both of the orientation or the location of the second sensory scene relative to the user;

presentation of the first sensory scene with a corresponding change in one or both of the orientation or the location of the first sensory scene relative to the user; or presentation of the first sensory scene within the defined sub-region with no change in the orientation or the location of the visual content of the first sensory scene relative to the user.

12. An apparatus according to claim 1, wherein the first sensory scene comprises the visual scene presented in the virtual reality space for viewing by the user, the user provided with a view comprising a sub-portion of the visual scene at any one time; and based on the user-lock-input to maintain at least one of the current user orientation or the current user location for the first sensory scene, the at least one memory and the computer program code are configured to, with the at least one processor, cause the apparatus to:

provide for, in the absence of at least one of the user-input to change user orientation in the virtual space and the user-input to change user location in the virtual space, presentation of the first sensory scene based on the current user orientation and the current user location; and provide for, on receipt of one or both of the user-input to change the user orientation in the virtual space or the user-input to change the user location in the virtual space:

presentation of the second sensory scene with the corresponding change in one or both of the orientation or the location of the second sensory scene relative to the user; or presentation of the first sensory scene with a corresponding change in one or both of the orientation or the location of the second sensory scene relative to the user until the user-input is no longer being received.

13. An apparatus according to claim 1, wherein the user-input to change the user orientation in the virtual space is based on a real-world head orientation of the user and the user-input to change the user location in the virtual space is based on a real-world translational movement of the user.

14. A method comprising:

providing, for presentation, virtual-or-augmented reality content comprising data to provide a virtual space in which to present a first sensory scene and a second, different sensory scene as one of virtual reality or augmented reality to a user having a location and orientation in the virtual space, the sensory scenes comprising content for presentation to the user at least from one of specific directions or specific locations in the virtual space, the sensory scenes selected from:
a visual scene for presenting visual content,
an audio scene for presenting audio content,
a tactile scene for presenting touch stimuli content,
an olfactory scene for presenting olfactory stimuli content, or
a taste scene for presenting taste stimuli content,
the sensory scenes defined relative to the virtual space such that one or both of a user-input to change user orientation in the virtual space or a user-input to change user location in the virtual space provides for a corresponding change in presentation of at least the first and second sensory scenes relative to the user to account for the orientation and location of the user in the virtual space;

providing for locking of the first sensory scene based on a user-lock-input to maintain at least one of a current user orientation or a current user location for the first sensory scene; and in response to the user-lock-input and receipt of at least one of the user-input to change the user orientation in the virtual space or the user-input to change the user location in the virtual space, provide for:

presentation of the second sensory scene with a corresponding change in the second sensory scene relative to the user to account for the change in one or both of the orientation or the location of the user in the virtual space; and presentation of the first, locked, sensory scene with no corresponding change in the first sensory scene relative to the user to account for the change in one or both of the orientation or the location of the user in the virtual space.

15. A method accordingly to claim 14, wherein the first sensory scene comprises one of the visual scene or the audio scene and the second sensory scene comprises the other of the visual scene or the audio scene.

16. A method according to claim 14, wherein based on a user-unlock-input to unlock the first sensory scene, and receiving user-input to change one or both of the user orientation in the virtual space to a new orientation or the user location in the virtual space to a new location prior to the user-unlock-input, further comprising:

providing for presentation of the first sensory scene with a change in one or both of:
the orientation of the first sensory scene relative to the user to correspond to the new orientation or
the location of the first sensory scene relative to the user to correspond to the new location.

17. A method according to claim 14, wherein the user-lock-input comprises one or more of:
a user gesture specific to the first sensory scene; or
a user actuation of a user interface specific to the first sensory scene.

18. A method according to claim 16, wherein the user-lock-input is provided based on performance of a user hand gesture by the user and the user-unlock-input is provided based on ceasing the performance of the user hand gesture by the user.

19. A method according to claim 18, wherein based on movement of the user's hand during performance of the user hand gesture, further comprising:

providing for presentation of the locked first sensory scene with a change in one or both of the orientation or the location of the first sensory scene relative to the user corresponding to the movement of the user's hand.

20. A non-transitory computer readable medium comprising program instructions stored thereon for performing at least the following:

provide for presentation of virtual-or-augmented reality content comprising data to provide a virtual space in which to present a first sensory scene and a second, different sensory scene as one of virtual reality or augmented reality to a user having a location and orientation in the virtual space, the sensory scenes comprising content for presentation to the user at least from one of specific directions or specific locations in the virtual space, the sensory scenes selected from:
a visual scene for presenting visual content,
an audio scene for presenting audio content,
a tactile scene for presenting touch stimuli content,
an olfactory scene for presenting olfactory stimuli content, or
a taste scene for presenting taste stimuli content,
the sensory scenes defined relative to the virtual space such that one or both of a user-input to change user orientation in the virtual space or a user-input to change user location in the virtual space provides for a corresponding change in presentation of at least the first and second sensory scenes relative to the user to account for the orientation and location of the user in the virtual space;

provide for locking of the first sensory scene based on a user-lock-input to maintain at least one of a current user orientation or a current user location for the first sensory scene; and in response to the user-lock-input and receipt of at least one of the user-input to change the user orientation in the virtual space or the user-input to change the user location in the virtual space, provide for:

presentation of the second sensory scene with a corresponding change in the second sensory scene relative to the user to account for the change in one or both of the orientation or the location of the user in the virtual space; and presentation of the first, locked, sensory scene with no corresponding change in the first sensory scene relative to the user to account for the change in one or both of the orientation or the location of the user in the virtual space.

21. An apparatus according to claim 1, wherein the received at least one of the user-input to change the user orientation in the virtual space or the user-input to change the user location in the virtual space is configured to cause a change with respect to at least one of the at least one of the current user orientation or the current user location maintained for the first sensory scene.

* * * * *